United States Patent [19]

Hug et al.

[11] Patent Number: 5,519,223
[45] Date of Patent: May 21, 1996

[54] APPARATUS AND METHOD FOR AUTOMATED COLLIMATOR EXCHANGE

[75] Inventors: Paul Hug, Saratoga; Douglas C. Watson, Santa Clara; Mark S. Fasnacht, Pleasanton; Horace H. Hines, San Jose; David A. Chan, Sunnyvale, all of Calif.

[73] Assignee: ADAC Laboratories, Inc., Milpitas, Calif.

[21] Appl. No.: 206,386

[22] Filed: Mar. 3, 1994

[51] Int. Cl.⁶ .................................................. G01T 1/161
[52] U.S. Cl. ...................................... 250/363.10; 378/148
[58] Field of Search ......................... 250/363.10; 378/148

[56] References Cited

U.S. PATENT DOCUMENTS

| 3,982,133 | 9/1976 | Jupa et al. | 378/148 |
| 4,109,155 | 8/1978 | Tschunt et al. | 378/148 |
| 4,129,784 | 12/1978 | Tschunt et al. | 378/148 |
| 5,146,094 | 9/1992 | Stark | 250/363.08 |
| 5,210,422 | 5/1993 | Kurakake et al. | 250/363.10 |

FOREIGN PATENT DOCUMENTS

| 57-161575 | 10/1982 | Japan | 250/363.10 |
| 1-263185 | 10/1990 | Japan | 378/148 |

Primary Examiner—Constantine Hannaher

[57] ABSTRACT

An automatic collimator exchanger for a gamma camera system for simultaneous exchange of pairs of collimators (or a single collimator) for a dual detector head system. The present invention includes an exchange assembly having an elevator, a carriage and a bridge. The elevator includes a rack of multiple parallel and stacked trays for holding various pairs of collimators. A draw bridge unit is attached to one side of the elevator (which side faces a gantry structure) and may extend into the gantry structure. The carriage is able to support two collimators and moves from within the elevator unit onto the bridge and into the gantry structure, when the bridge is lowered, to position between two aligned detector heads of the dual head gamma camera system. When the detector heads are positioned near the aligned carriage, latch pins are released and collimators may be transferred to the carriage, if empty, or hastened to the detector heads from the carriage when installing a pair of collimators. Sliding lock plates (each having hooks and a safety latch pin) are mounted on both sides of each of the detector heads and are used to transfer the collimators between the carriage and the detector heads during the exchange (for removal and installation) and are used to secure the collimators to the detector heads during an imaging session. One collimator or a pair may be simultaneously exchanged using the present invention without operator intervention.

56 Claims, 22 Drawing Sheets (EXCHANGER) ← → (GANTRY)

APPARATUS AND METHOD FOR AUTOMATED COLLIMATOR EXCHANGE

BACKGROUND OF THE INVENTION

(1) Field of the Invention

The present invention relates to the field of gamma cameras used in the area of nuclear medicine. More specifically, the present invention relates to the field of collimator exchange mechanisms for exchanging collimator devices that are used in conjunction with gamma cronera detector heads in clinical imaging sessions.

(2) Prior Art

Nuclear or scintillation cameras (also called gamma cameras) are responsive to radiation emitted from a radiopharmaceutical injected into a patient during an imaging study. A given radiopharmaceutical is typically selected that will target a particular organ or tissue of interest. In computed tomography studies, a detector head (or pair) revolves around the patient and collects the emissions at various angles in order to generate an image of the targeted organ or tissue. In total body studies the detectors may translate at a fixed or variable attitude along the patient. In ECT studies, the image data collected at each angle is merged together into a database that is representative of a three dimensional image of the targeted organ or tissue by a mathematical procedure called reconstruction tomography. The image data collection and tomography is performed by a computer process and a computer system and the resultant images may be displayed in a variety of fashions on a computer controlled display screen. The above process is called an Emission Computed Tomography study or ECT study. Gamma camera detectors are also used in many types of studies which do not employ tomography for image generation, such as total body studies.

Each detector head of a gamma camera utilizes a collimator which is placed in front of the detector mechanism that responds to the incident emissions. The collimator is a device for collimating the incident radiation emissions and for filtering out certain types of unwanted radiation emissions. A collimator is typically manufactured from lead material and is composed of an array of parallel tubes and as such resembles a lead "honey comb." A collimator may weigh from 100 to 250 pounds or more individually and each is mounted on the receiving end of the gamma camera detector to cover the imaging surface.

Collimators have particular characteristics that are most suited to the patient study and the energy of the radiation emissions from the ingested radiopharmaceutical. For instance, some collimators are better suited for gamma camera studies of a given energy range, or a given emission exposure duration or a given radiopharmaceutical. As such, there is a great need to exchange collimators associated with the detector heads for different ECT or total body studies. Moreover, as different radiopharmaceuticals are used for different gamma camera studies, different collimators are often needed and must be installed by a technician. Further, each collimator must be securely fastened to the detector head during gamma camera studies to prevent collimator separation from the imaging surface as the detector heads revolve or rotate. Clearly, it would be advantageous, then, to provide an automated mechanism for quickly and correctly exchanging collimators associated with the camera detectors in between gamma camera studies. The present invention provides such capability.

In the prior art, collimators were manually exchanged and were mounted on trays, trolleys, or carts that were manually positioned or aligned adjacent to a detector head and fastened manually to the camera. This involved a time consuming operation and required a great deal of manual exertion due to the extreme weight and awkward size of the collimators. The exchange process often could not be performed by the usual gamma camera technicians and therefore the exchange was additionally time consuming because additional personnel were required to perform the manual exchange. Not only did the manual exchange require additional time and personnel (adding to the expense of the gamma camera study), but by using manual alignment and exchange means the collimators suffered the risk of being installed improperly or misaligned. These factors contribute to the quality, reproducibility and precision of data collected (and the resultant image) during a gamma camera study. Therefore, it would be advantageous to provide a mechanism and method that automatically exchanged collimators for a gamma camera detector head without requiring extensive operator interaction. It would also be advantageous to automate the exchange procedure in order to insure that collimators are properly selected, aligned and installed. The present invention provides for such functionality.

Some prior art mechanisms are employed to automatically exchange a collimator with a single detector head. For example, U.S. Pat. No. 5,146,094 issued to Stark on Sep. 8, 1992, provides an automated mechanism wherein one collimator may be exchanged with one detector head. The detector head must be lowered and moved in alignment with a tray of collimators and a collimator may be directly loaded onto (or removed) the detector via a groove installed within the detector head. Other prior art devices, as described in U.S. Pat. Nos. 3,982,133 (issued to Jupa et al.); 4,129,784 (issued to Tschunt et al.); and 4,109,155 (issued to Tschunt et al.), directly exchange a single collimator for a single detector head using a swivel mechanism. However these prior art devices do not account for dual head gamma cameras and as such do not provide the means for exchanging two collimators at the same time for a camera system with a dual detector head arrangement. It would be advantageous to provide an exchange mechanism that operates to exchange, simultaneously, collimators for a dual head gamma camera system without requiring manual means or extensive operator intervention. The present invention provides such mechanisms and capabilities.

Accordingly, it is an object of the present invention to provide a more efficient nuclear medicine gamma camera system. An object of the present invention is to provide mechanisms and means for automatically removing and installing a collimator on a detector head without requiring manual exertion or manual operation. It is another object of the present invention to provide an automated exchange mechanism for simultaneously exchanging collimators on a dual head gamma camera system without requiring extensive operator interaction. It is further an object of the present invention, given a pair of collimators already mounted on a pair of detector heads, to provide a mechanism and method for allowing an operator to select an input pair of collimators for use in a gamma camera study and for automatically exchanging the pair of collimators mounted on the detector heads with the selected pair without further operator intervention. It is yet another object of the present invention to provide such an exchange mechanism that may perform its exchange operations within the spatial area of the gantry structure of the gamma camera system in order to reduce the amount of floor space required for the exchange operation and required of the resultant gamma camera system. It is further an object of the present invention to provide a collimator removal and installation mechanism that prevents collimator separation from the detector head during a gamma camera imaging session (e.g., clinical study).

It is further an object of the present invention to provide a gamma camera system that employs a collimator exchanger mechanism that may simultaneously and automatically exchange collimators of a dual detector head arrangement. These and other objects of the present invention not specifically mentioned above will become clear upon review of the discussions of the present invention to follow.

SUMMARY OF THE INVENTION

An automatic collimator exchanger for a gamma camera system for simultaneous exchange of pairs of collimators for a dual detector head system is described. The present invention includes an exchange assembly having an elevator, a carriage and a bridge. The elevator includes a rack of multiple parallel and stacked trays for holding various pairs of collimators. The elevator unit is securely attached to a base structure. A draw bridge unit is attached to one side of the elevator and may extend within the gantry structure. The carriage is able to support two collimators and moves from within the elevator unit onto the bridge and into the gantry structure, when the bridge is lowered, to position between two aligned detector heads of a dual head gamma camera system. When the detector heads are aligned and positioned near the extended carriage, latch pins are released and the collimators may be transferred to the carriage, if empty, or fastened to the detector heads from the carriage when installing a pair of collimators. Sliding lock plates (each having hooks and a safety latch pin) are mounted on both sides of each of the detector heads and are used to transfer the collimators between the carriage and the detector heads during the exchange (for removal and installation) and are used to secure the collimators to the detector heads during an imaging session. The carriage drives the slide plates into a locked or unlocked position. One collimator or a pair may be simultaneously exchanged using the present invention without operator intervention.

More specifically, embodiments of the present include, an apparatus for exchanging a collimator associated with an imaging surface of a detector head which is coupled to a gantry structure of a gamma camera, the apparatus having: elevator means for positioning trays of a rack of collimator trays to align with a track means; bridge means for positioning a portion of the track means horizontally within the gantry structure, the bridge means coupled to the elevator means; carriage means coupled to traverse the track means, the carriage means for moving the collimator between the detector head and the elevator means; and locking means coupled to both sides of each of the detector head for installing the collimator to the imaging surface of the detector head and for removing the collimator from the imaging surface of the detector head.

Further embodiments of the present invention include the embodiment above and wherein the locking means having: slide plate means for locking to couple the collimator to the detector head and for unlocking to release the collimator; and latch pin means for latching the slide plate means into a locked position or into an unlocked position and wherein the slide plate means having sliding hooks for locking onto or releasing mounting shafts of the collimator for installation or removal of the collimator from the detector head. Embodiments of the present invention include the above and further including means for positioning the detector head toward or away from the carriage means when the carriage means is aligned along the track means with the detector head and wherein the carriage means comprises means for unlatching the latch pin means when the detector head contacts the carriage means and for latching the latch pin means when the detector head separates from the carriage means and further comprising means for driving the slide plate means to release the collimator from the detector head and for driving the slide plate means to lock the collimator to the detector head and further wherein the means for driving the slide plate means includes drive plate means coupled to the carriage means for coupling the carriage means to the slide plate means and a carriage motor means for driving the carriage means and the drive plate means.

The present invention also includes an embodiment drawn to an apparatus for exchanging a pair of collimators from imaging surfaces of a pair of detector heads which are coupled to a gantry structure of a gamma camera, the apparatus including: track means for providing a pathway to carry the pair of collimators; bridge means for positioning a portion of the track means horizontally within the gantry structure, the bridge means coupled to a collimator storage means; carriage means coupled to traverse the track means, the carriage means for moving the pair of collimators between the pairs of detector heads and the collimator storage means; and locking means coupled to either side of each of the pair of detector heads for simultaneously installing the pair of collimators to the imaging surfaces or simultaneously removing the pair of collimators from the imaging surfaces and wherein the locking means includes slide plate means for locking to couple each collimator of the pair of collimators to a separate detector head of the pair of detector heads and for unlocking to release the collimators and latch pin means for latching the slide plate means into a locked position or into an unlocked position.

Embodiments of the present invention also include a method of exchanging a pair of collimators with a pair of detector heads or exchanging a single collimator with a single detector head using elements of the above and also a gamma camera system having elements of the above.

DETAILED DESCRIPTION OF THE INVENTION

Figure 1A:
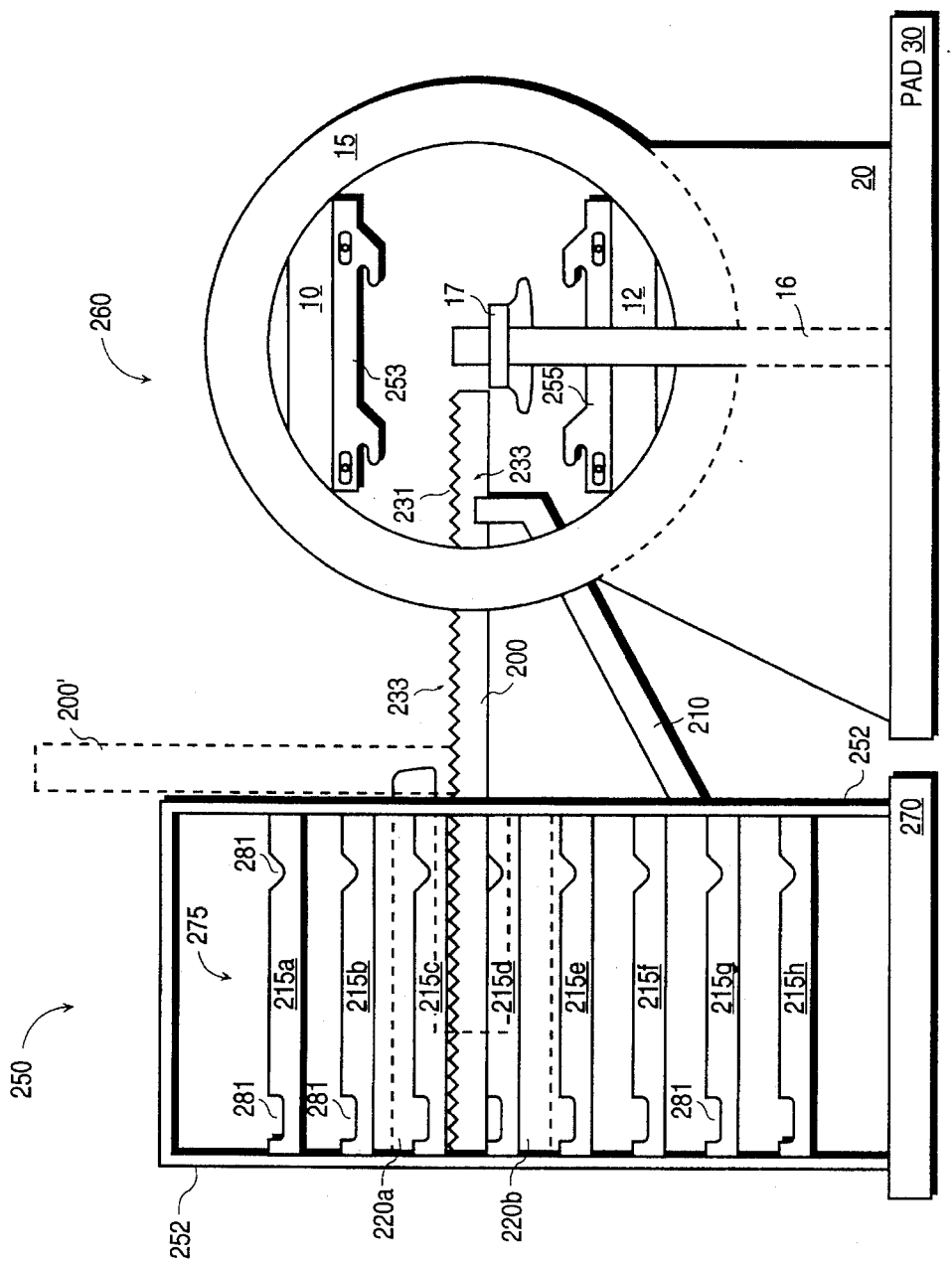
FIG. 1A illustrates a side orthogonal view of the exchanger assembly and gantry of the gamma camera system of the present invention with the carriage positioned within the elevator and the bridge bowed within the gantry.

The present invention includes an apparatus and method for exchanging a pair of collimators with a dual detector head gamma camera system and for exchanging a single collimator. An exchanger assembly is included along with the gantry structure of a gamma camera system. A gantry structure, as described in copending U.S. patent application Ser. No. 07/704,759 entitled Adjustable Dual-Detector Image Data Acquisition System filed May 23, 1991 and assigned to the assignee of the present invention, may be used by the present invention. It is appreciated that other gantry structures may also be utilized. The gantry structure supports the detector heads and allows the detector heads to move radially inward and outward and also a single detector may rotate clockwise or counterclockwise individually about its own axis and both detectors may individually rotate about a common center of axis along the gantry structure. The gantry structure itself is free to traverse along a fixed track, but the exchanger is fixed and secured to a base. Therefore, before an exchange operation takes place, the gantry structure must align adjacent to the exchanger assembly. The exchanger assembly includes a carriage and a draw bridge and a rack of parallel stacked trays which contain collimators for use, the rack is positioned within an elevator unit.

Generally, when a dual collimator exchange operation is input by an operator, assuming there are a pair of collimators on the detector heads, the draw bridge is lowered to extend within the gantry and the carriage rolls along a track that runs along the elevator and the bridge to position between the pair of detector heads within the gantry structure. The detector heads radius toward the carriage which unlatches latch pins to free sliding lock plates. The carriage drives sliding lock plates open to release the mounting shafts of a pair of collimators from the detectors into notches of the carriage to receive the mounting shafts of the collimators when the carriage drives to the unlocked position. The sliding lock plates one (on each side of a detector head) are then held open by the latch pins when the detector heads radius away. The carriage then moves into the elevator which has moved up or down to provide the correct two empty trays to receive the removed collimators. The elevator unit then lifts the collimators by their mounting shafts out of the carriage. The carriage then moves onto the extended bridge to clear the elevator and the elevator moves the trays again to align the new pair of selected collimators with the pair of carriage trays. The carriage moves back into the elevator and the elevator lowers to load the two selected collimators onto the carriage. The carriage moves onto the bridge again and aligns between the detector heads on the gantry. The pair of detector heads radius in to the carriage and the latch pins release to unlock the sliding lock plates. The sliding lock plates then slide to lock onto the mounting shafts of the collimator and couple the new collimators to the detectors when the carriage drives back to the locked position. The latch pins are locked as the detectors then move to clear the carriage. The carriage then returns within the elevator and the bridge is raised to exit the gantry structure. It is appreciated that the present invention may also be utilized to exchange (retrieve, store, or both) a single collimator by not positioning a corresponding detector head to interface with the carriage.

In the following detailed description of the present invention numerous specific details are set forth in order to provide a thorough understanding of the present invention. However, it will be obvious to one skilled in the art that the present invention may be practiced without these specific details. In other instances well known electronics, methods, procedures, components, and circuits have not been described in detail as not to unnecessarily obscure aspects of the present invention.

Some portions of the detailed description of the processing flows of the present invention which follow are presented in terms of procedures and symbolic representations of operations on data within a computer memory or processed by a computer system. These descriptions and representations are the means used by those skilled in the data processing arts to most effectively convey the substance of their work to others skilled in the art. A procedure or processing flow is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

With reference to FIG. 1A, a side view of the exchanger assembly 250 and the gantry structure 260 of the present invention is shown. The gantry structure 260 used in the preferred embodiment of the present invention is the Vertex™ system of ADAC Laboratories of Milpitas, Calif. However, any dual camera system may advantageously utilize the exchanger assembly 250 of the present invention. The gantry 260 shown in FIG. 1A is for a dual head camera system, however the present invention may also operate within a single head camera system. Gantry ring gears 15 supports detector heads 10 and 12 and the gantry ring gears 15 are supported in turn by outer gantry plates 20 coupled to floor 30. As shown, the detector heads 10 and 12 are positioned inward radially and not fully extended radially. Located on the inward facing side of detector 10 is a sliding lock plate 253 and another sliding lock is also located on the nonfacing side of the detector. Located on the facing side of detector 12 is a sliding lock plate 255 which another is also located on the nonfacing side of the detector. The sliding lock plate pairs 253 and 255 will act to secure the collimators onto their respective detector heads. The gantry ring gears 15 are mounted such that they may rotate clockwise or counterclockwise to rotate the detector heads in an 370 degree field. The detector heads 10 and 12 are also mounted such that each may move inward or outward radially. The detector head 10 may also rotate about its own axis parallel to the main gantry axis. A table 17 is placed within the gantry ring 15 for supporting a patient under study and moves under two degrees of freedom. The table is supported by support 16 which is mounted on a level floor pad 30. The entire gantry structure 260 rides on a track mounted to the level floor pad 30 on the ground which allows the gantry to move along the central axis of the gantry structure (e.g., in and out of the page of FIG. 1A). This allows the gantry 260 to move along the long axis of a patient during ECT or total body clinical scan sessions.

Also shown in FIG. 1A is the exchanger assembly 250 of the present invention. The bridge unit 200 is shown in its fully extended state. The bridge support 210 is extended and is used to raise or lower the bridge 200. A bridge motor (not shown) is mounted on the frame 252 and raises or lowers the bridge support 210. The bridge 200 is also shown in its raised vertical position by a dashed outline of bridge 200'. In position 200', the bridge 200 of the present invention is fully clear of the gantry structure 260 and the gantry structure 260 may perform all of its available clinical and imaging session movements. Along both of the outer edges of the bridge 200 is a linear gear track 231 which runs the length of the bridge 200 and also runs within the exchanger assembly 250. A separate V-track 233 also runs parallel to each gear track 231 above the bridge 200 and the V-track 233 also runs beneath the bridge 200. The carriage 220, which is shown here as fully contained within the exchanger assembly 250, run along the gear track 231. The gear track 231 and V-track 233 run within the exchanger rack 275 so that the carriage segment 220a and 220b may align within the rack 275 in order to retrieve and unload collimators. Since the gantry structure 260 is free to move along the track that runs along the central axis of the gantry ring 15 and since the exchanger assembly 250 is stationary, the gantry structure 260 must align adjacent with the exchanger assembly 250 before an exchange operation may be performed with the present invention.

Also shown in FIG. 1A are the eight collimator trays 215a–215h of the rack 275 of the present invention. Tray pair 215a and 215e are in level 0; tray pair 215b and 215f are in level 1; tray pair 215c and 215g are in level 2; and tray pair 215d and 215h are in level 3. When withdrawn into the tray rack, the carriage segment 220a (upper) and 220b (lower) will align with two trays of the same level that is aligned with the carriage. For instance, the two trays of level 0 may align with the carriage, or level 1, or level 2 or level 3. Carriage segment 220a will align with the upper collimator tray of a given level and carriage segment 220b will align with the lower collimator tray of the given level. In order to align a pair of trays of a given level to the carriage, the elevator rack 275 raises or lowers the rack of trays appropriately, via motor 277 (FIG. 44). For storing collimators, the elevator trays 215a–215h are approximately 127 mm apart. The elevator rack 275 is free to move up and down approximately 450 min. To receive pairs of collimators from the carriage segment 220a and 220b, the present invention positions the elevator rack 275 at the on-carriage position for a given level for a pair of empty elevator trays (for instance trays 215b and 215f of level 1). The on-carriage and on-elevator positions are defined to follow.

In order to transfer a pair of collimators from the carriage segment 220a and 220b to a pair of elevator trays of a given level, the present invention moves the elevator rack 275 up by approximately 60 mm to the on-elevator position. The distance between the on-carriage and the on-elevator position is approximately 60 mm for a given level. During the transfer, the side walls of the trays, for instance 215b and 215f, are inside the carriage walls for carriage segment 220a and 220b, respectively. The trays, via four notches 281 each, contact four mounting shafts located on the collimators and raise the collimators off corresponding notches of the carriage segment 220a and 220b thus performing the transfer from the carriage to the elevator structure 250. The trays, via the notches 281, support the collimators via the mounting shafts which are attached to the collimator sides. In this fashion, collimators may be transferred between the carriage 220 and the elevator trays 215a–215h.

Referring still to FIG. 1A, to transfer collimators from a pair of elevator trays of a given level to the carriage segment 220a and 220b, the present invention moves the carriage within the tray of rack 275 and then moves the elevator structure 275 a distance 60 mm down from an on-elevator position to an on-carriage position for the given level. This action causes the collimator pairs to be lowered from the pair of trays, for instance 215b and 215f, to the trays of carriage segment 220a and 220b, respectively. Since there are four pairs of trays within the exchanger assembly 250 and each has both an on-carriage and an on elevator position, there are eight possible positions of the elevator rack for collimator transfer within the present invention. Additionally, there are two elevator limit (max/min) positions. Table II below illustrates the various elevator rack 275 positions that may be detected by the present invention corresponding to these transfer positions. It is appreciated that the positions as shown in Table II are for illustration only and are approximate, other dimensions and positions may fall within the spirit and scope of the present invention.

TABLE II

| | |
|---|---|
| −10 mm | Minimum down position |
| 0 mm | On-Carriage for Level 0 (trays 215a/215e) |
| 60 mm | On-Elevator for Level 0 trays |
| 127 mm | On-Carriage for Level 1 (trays 215b/215f) |
| 187 mm | On-Elevator for Level 1 trays |
| 255 mm | On-Carriage for Level 2 (trays 215c/215g) |
| 315 mm | On-Elevator for Level 2 trays |
| 382 mm | On-Carriage for Level 3 (trays 215d/215h) |
| 444 mm | On-Elevator for Level 3 trays |
| 450 mm | Maximum height position |

Figure 1B:
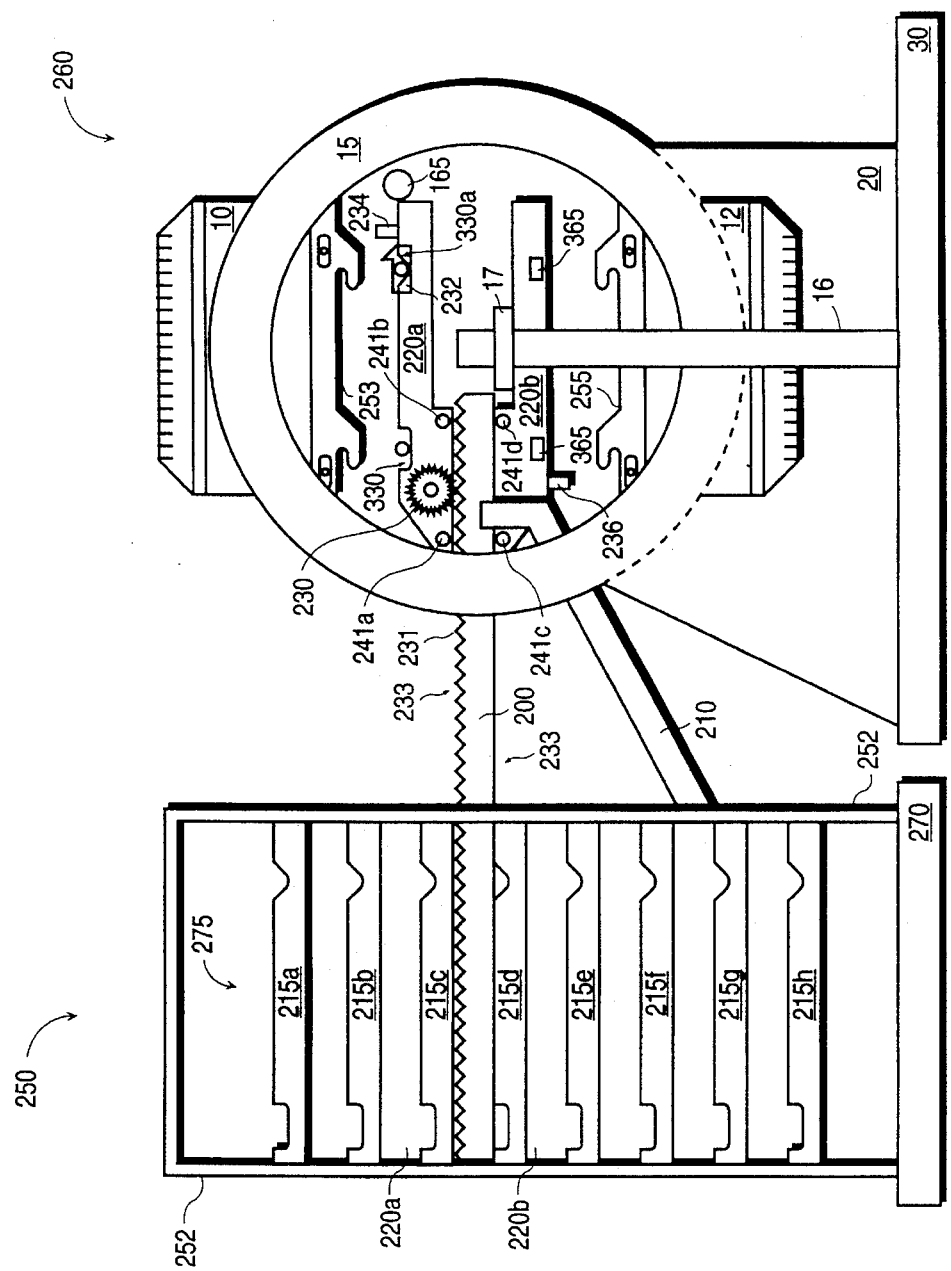
FIG. 1B illustrates a side orthogonal view of the exchanger assembly and gantry of the gamma camera system of the present invention with the carriage on the extended bridge.

With reference to FIG. 1B, a side view of the gantry structure 260 and the exchanger assembly 250 of the present invention is shown with the bridge 200 extended horizontally and the carriage 220 in the fully extended position on the bridge. The carriage 220 has an upper segment 220a for supporting and containing collimators for the upper detector head 10 and a lower segment 220b for supporting and containing collimators for the lower detector head 12. The carriage 220 is shown on the fully extended position on the bridge 200 such that a significant portion of the carriage 220 extends out, cantilevered, over the bridge 200. It is appreciated that V-groove wheels 241a–241d (there are a total of four located on each side of the carriage 220) prevent the carriage 220 from tipping while cantilevered or otherwise and are mounted to traverse V-tracks 233 which are mounted above and below the bridge 200. In this position, the carriage segment 220a aligns with the detector head 10 and the carriage segment 220b aligns with the detector head 12. Carriage segment 220a aligns with the pair of sliding lock plates 253 of detector head 10 while carriage segment 220b aligns with the pair of sliding lock plate 255 of detector head 12. As shown in FIG. 1B, the detector head 10 and the detector head 12 are shown in their maximum radially extended position to allow the carriage 220 enough room to clear the gantry structure 260 to move from the position 200' to the extended, cantilevered, position. In the extended position, the carriage segments 220a and 220b surround the head of table 17 which remains stationary during an exchange operation of the present invention.

The carriage 220 rolls by the four V-groove wheels 241a–241 d (on each side) along the V-tracks 233 located above and below bridge 200 on both sides. The V-groove wheels are used to align the carriage. The carriage is driven along the ridged gear track 231 of the bridge 200 by gears 230 fabricated of metal which are located on either side of the carriage segment 220a (only one is shown in FIG. 1B). The structurally reinforced gears 230 and the metal gear track 231 are employed by the present invention in order to drive the carriage 220 while the V-groove wheels 241a–241d and V-tracks 233 are used to carry the weight and smoothly position the carriage while loaded with collimators because the resultant weight of the full carriage can exceed 500 pounds. The four V-groove wheels (two per side) of the carriage 220a roll along the smooth V-tracks to allow the carriage segment 220a to rest horizontally along the bridge 200. Four more V-groove wheels (two per side) are mounted on carriage segment 220b and also run along separate V-tracks to support the carriage structure. Notches 330 and 330a of both sides of carriage segment 220a support the mounting shafts of the collimator while resting in upper carriage segment 220a. A similar pair of notches are located on the opposite side of the carriage segment 220a (not shown in FIG. 1B) for supporting the collimator. Similarly, inner notches 365 (of both sides of collimator segment 220b) hold and support the mounting shafts of the collimator while resting in the lower carriage segment 220b. In this fashion, the carriage 220 of the present invention may contain a pair of collimators for exchange and position the pair from the elevator rack 275 to align with the detector heads.

Figure 7:
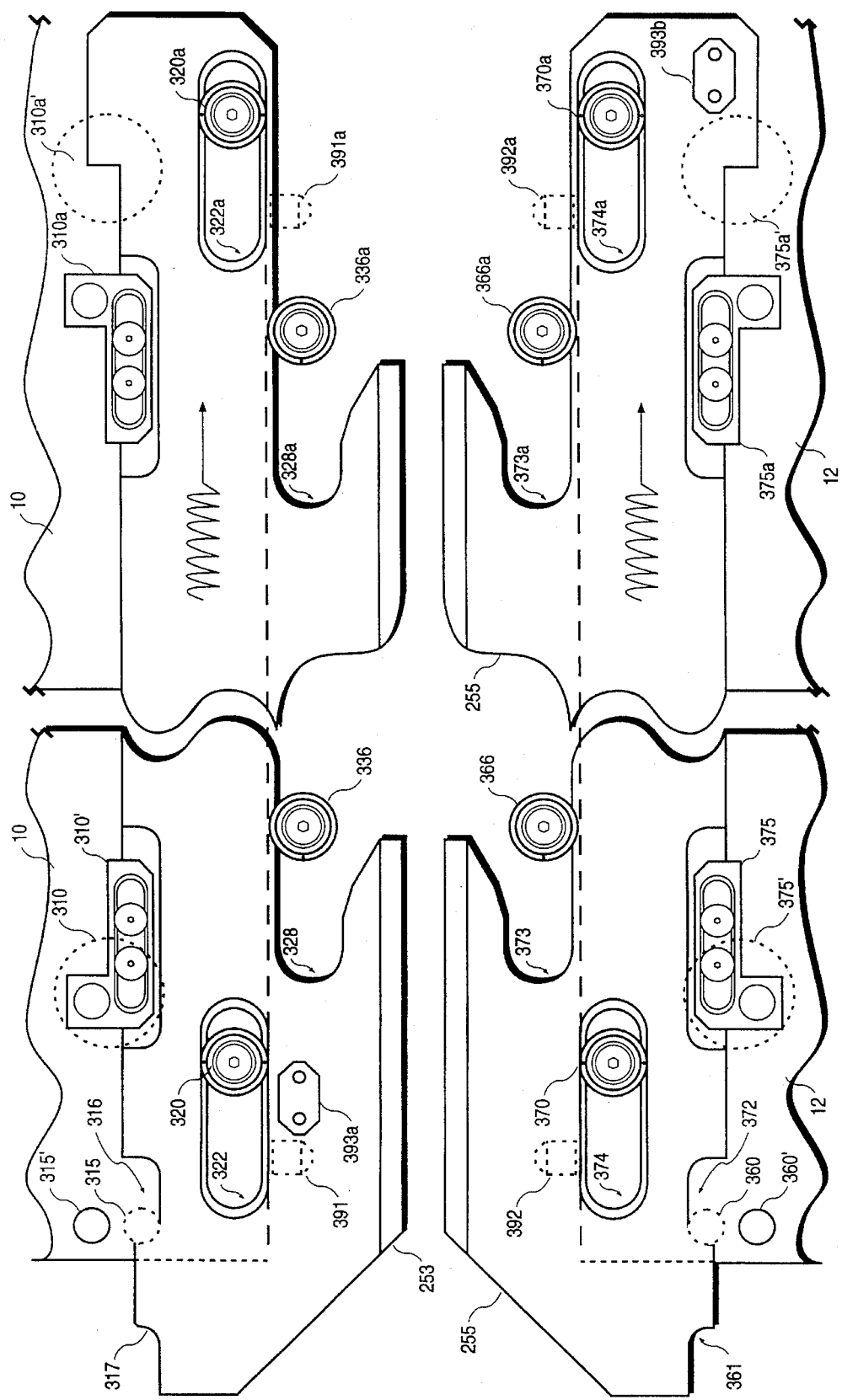
FIG. 7 is a side view illustration of the locking plates of the present invention located on the upper and lower detector heads for securing the collimators to the detector heads in the unlocked position.

Also located on the carriage segment 220a is a push plate (or "drive plate") 234 and guide block 232 which are for interfacing with components of the sliding lock plate 253 of the detector head 10. There is a separate push plate 234 and guide block 232 located on each side of the carriage segment 220a and only one of each is illustrated in FIG. 1B. As the detector head 10 is moved downward to interface with the carriage segment 220a, the guide block 232 and the push plate 234 interact with sliding lock plates 253 located on either side of the detector head 10 in order to unlock either the sliding mechanisms of the present invention which secure a collimator onto a detector head and allow collimators to be transferred between the detector head 10 and the carriage segment 220a of the present invention. Push plate 234 interfaces with a latch pin and push plate 234 and guide block 232 interface with a drive block 393a (FIG. 7). On carriage segment 220b there is located a drive plate 236 which is used for interfacing with the sliding lock plates 255 located on either side of the lower detector head 12. Detector 12 interfaces with carriage segment 220b when detector 12 is positioned radially upward to fit inside the carriage segment 220b and contact the collimator. The drive plate 236 interfaces with drive block 393b (FIG. 7) is used for sliding the lock plates open so that the collimators may be transferred from detector 12 to carriage segment 220b. It is appreciated that when detectors 10 and 12 are aligned for an exchange operation of the present invention, detector 10 is positioned at zero degrees rotation and detector 12 is aligned at 180 degrees rotation relative to the gantry ring 15. Both detectors 10 and 12 are oriented at zero degrees rotation relative to their own axis of rotation such that the imaging surfaces are facing each other and are essentially parallel to each other and the carriage 220 (as shown). Also shown in FIG. 1B is a side view of the carriage motor 165 which provides the driving torque to drive the gear wheels 230 on carriage segment 220a.

Figure 1C:
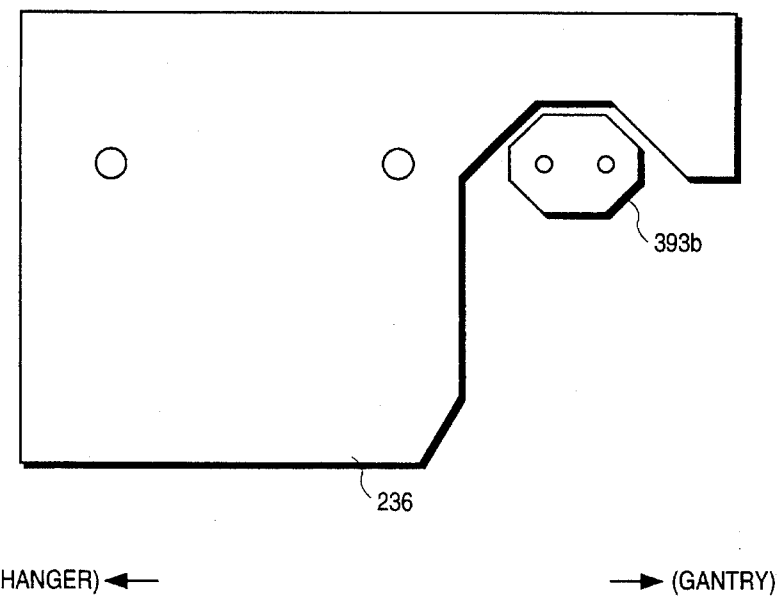
FIG. 1C illustrates alternative designs for the drive plate.
Figure 1C:
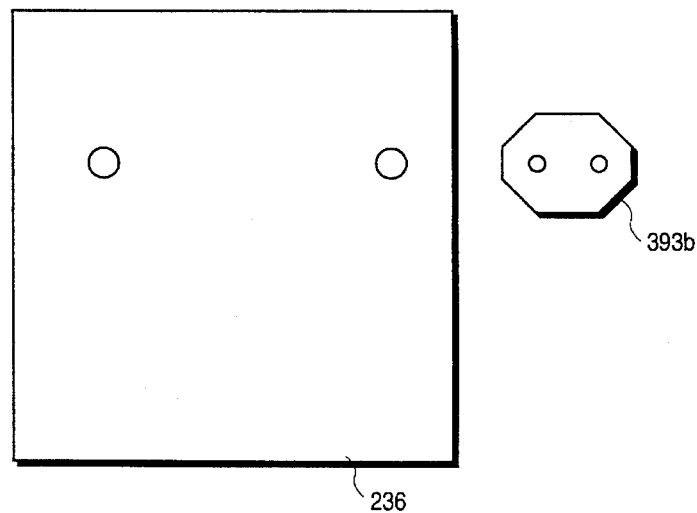

FIG. 1C illustrates 2 alternative designs for drive plates 236. The top plate is the preferred implementation and as shown surrounds the drive block 393b to push and pull the associated lock plate 255. The bottom plate 236 illustrates an alternative embodiment that relies on the spring of plate 255 to provide partial movement of plate 255 for locking.

Figure 2A:
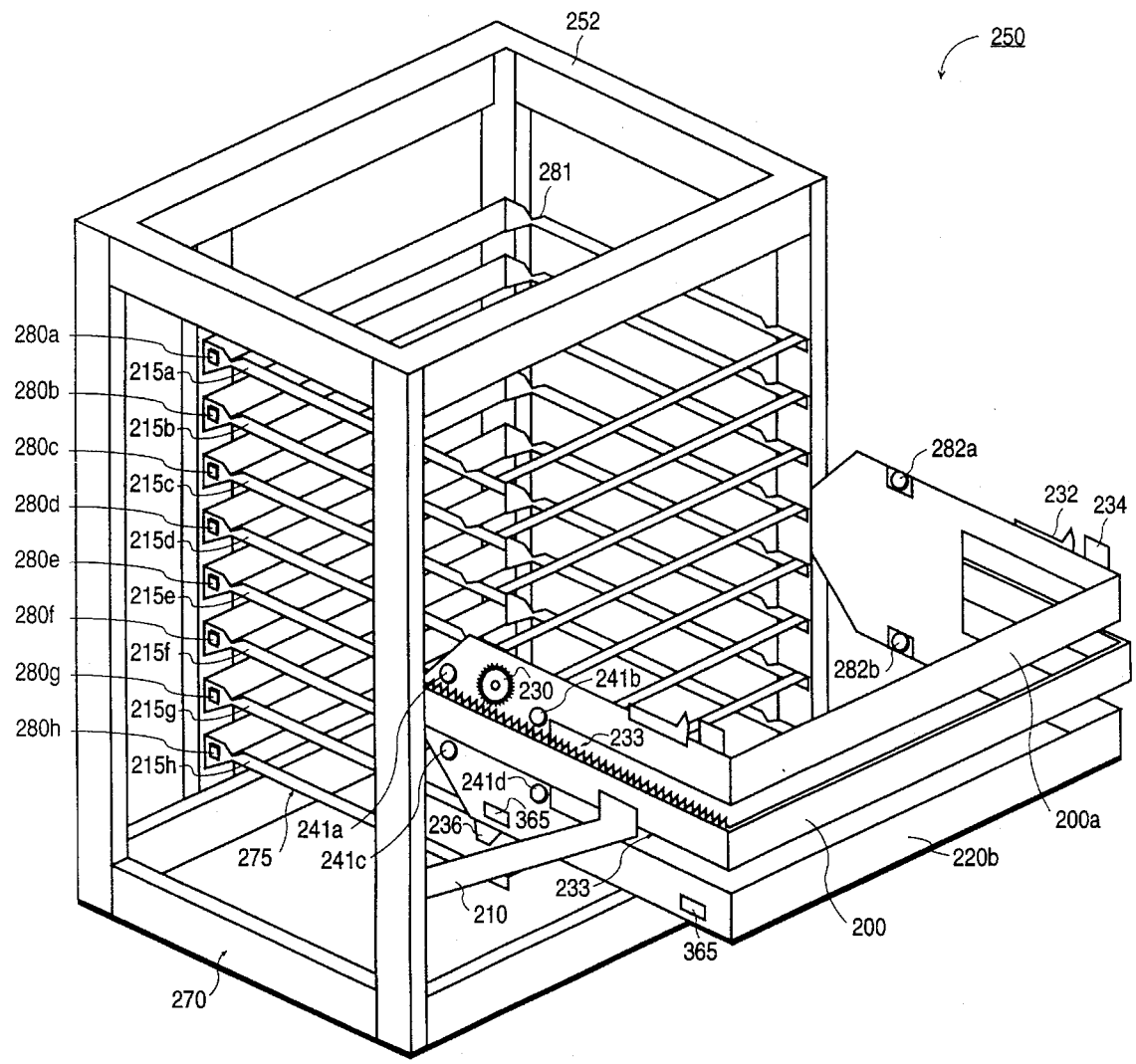
FIG. 2A illustrates a front view of the elevator unit and carriage and bridge components of the present invention dual collimator exchanger.

With reference to FIG. 2A, the front side of the exchanger assembly 250 of the present invention is illustrated. The elevator is composed of a rectangular frame 252 which contains an elevator rack 275 of eight parallel trays numbered 215a through 215h, each tray may contain one collimator. The elevator rack 275 is located within an elevator frame 252 and reference to the elevator rack or elevator unit may include the rack and frame as appropriate. Each of the eight trays contains four notches 281 within the tray which are used to support the four mounting shafts (see FIG. 4B) which extend from a collimator, two mounting shafts per side of a collimator. Each tray contains a microswitch 280a through 280h which detects the physical presence of a collimator stored in the tray and communicates to an exchange MPU (see FIG. 10A). The mounting switch may be installed at any location within the tray, but in the present invention is mounted in the middle of the back side of the tray. Each of the eight microswitches 280a–280h is wired into the MPU unit 1076 of the exchanger assembly for status communication. The surface side of each collimator activates the sensors 280a–280d and the detector side of the collimator activates the sensors 280e–280h. Trays 215a–215d hold collimators that correspond to the upper detector head 10 (upper levels 0 to 3, respectively) and trays 280e–280h hold collimators that correspond to the lower detector head 12 (lower levels 0 to 3, respectively) of the gamma camera system, see for example FIG. 1A. For each level, the present invention operates with one pair of trays and thus one pair of collimators. To transfer a single collimator the carriage may transport two collimators on the bridge, but only one detector head will radius in to interface with the carriage 220.

It is appreciated that more or fewer trays could be implemented within the scope of the present invention and that an eight tray embodiment is selected because it allows four different pairs of collimators for a dual head system which appears to meet the needs of most (if not all) nuclear imaging sessions. The elevator frame 252 is fabricated from reinforced metal because of the weight suspended in the rack. The elevator frame 252 must be able to suspend at least 1 ton of weight since eight collimators at 250 pounds each may exceed 2000 pounds. The elevator frame 252 of the present invention is securely mounted (via brackets and or bolts) to the floor of the imaging room or, alternatively, should be mounted on a base plate of metal.

FIG. 2A also illustrates the carriage 220 of the present invention in its extended position outside of the exchanger elevator rack 275. The carriage is composed of an upper carriage segment 220a and a lower carriage segment 220b which are fixed together. A draw bridge 200 is also illustrated in its extended horizontal position. The bridge 200 swings about two pivot bearings mounted at two corners of the exchanger frame 252 and is lowered or raised by lifting action from a bridge support 210 which is powered by a motor (not shown in FIG. 2A). The support 210 attaches to the bridge via slides which run in slots on the sides of bridge 200. Carriage segment 220a is positioned above the bridge 200 and carriage portion 220b is positioned below the bridge 200 when the carriage 220 is positioned on the bridge and the bridge is extended (lowered). There are two Hall effect magnetic sensors 282a and 282b for detecting the presence of collimators in carriage segments 220a and 220b, respectively. These Hall effect sensors 282a and 82b are wired into the exchanger MPU 1076 for status communication. One of the mounting shafts of each collimator activates the sensors 282a and 282b. There are two other sensors, identification sensors, located on the detector heads 10 and 12 for reading a binary code which is affixed to the detector side surface of each collimator to detect collimator type. When a collimator is installed on the upper or lower head, the sensor on each head reads the hard wired binary code on the collimator to determine the type and identity of the collimator. In this way the exchanger controller system 1076 (see MPU of FIG. 10A) may determine if the proper collimator has been loaded onto each detector head.

FIG. 2A also illustrates linear gear track 231 which extends along the left and right sides of the bridge 200 and also into the elevator rack 275. The gear track 231 is ridged with thick metal teeth or ridges to allow similarly ridged gears 230 located on either side of carriage segment 220a to roll across the track. The carriage 220 is carried by V-grooved wheels 241a–241d which each roll on raised V-tracks 233 (see FIG. 5) located on both the top and bottom of the bridge 200 and within the frame 252. When the bridge 200 is in the lowered position, the carriage 220 may roll out of the frame 252 outward to the end of the bridge 200, thus suspending (cantilevered) some of the carriage 220 beyond the end of the bridge 200 proper. The carriage 220 is driven by gears 230 which mesh with the gear track 231 mounted alongside the upper V-tracks 233 on the bridge 200 and within the frame 252. As shown in FIG. 2A, the carriage is approximately in between its maximum (over bridge edge) and minimum (within the frame 250) travel positions. It is appreciated that the above carriage drive system is exemplary and other drive systems may be employed within the scope of the present invention.

When within the elevator rack 275 or frame, a pair of collimators may be transferred between the carriage segments 220a and 220b and the trays 215. In order to perform such a transfer, the carriage side walls are configured such that they surround a given elevator tray once the carriage 220 is placed into the elevator rack 275 or frame. Therefore, as the elevator rack 275 is moved up or down relative to the carriage, the four notches of each of the side walls of the carriage are used in conjunction with the notches of the trays to hook or release the mounting shafts of the collimators. For instance, associated with each carriage segment (220a or 220b), there are four receiving notches for accepting mounting shafts or posts associated with a collimator located within the aligned trays of the elevator rack. In order to load a collimator 505 (see FIG. 4B) from a tray 215 into an empty carriage segment, the carriage 220 is positioned into the elevator rack 275, aligned with the collimator of interest, and the elevator rack 275 is lowered with respect to the carriage 220 so that the notches of the carriage 220 may pick up the collimator by its mounting shafts 366. This is true for both carriage segments 220a and 220b. The reverse is done to transfer collimators from the carriage 220 to the elevator rack 275. For instance, once the a pair of trays are aligned with the carriage 220, elevator rack 275 is raised to pick up collimators from the carriage 220 onto the aligned trays of the elevator rack.

Referring still to FIG. 2A, the elevator rack 275 moves vertically up and down to align a particular level (pair of trays) to the carriage. There are two vertical positions of the elevator rack 275 associated with each tray level within the elevator rack of the present invention. The two elevator positions are the on-carriage position and the on-elevator position. The on-carriage elevator position for a given level is the position at which the collimators are setting on the carriage when the carriage is within the elevator frame 252. At an on-carriage position, a collimator-carrying carriage 220 can be moved onto the bridge 200 from the elevator rack 275 or back from the bridge 200 to the elevator rack 275. As stated, the other position of the elevator rack 275 is the on-elevator position. The on-elevator position for a given level is the position at which the system has completed lifting a pair of collimators off the carriage 220 and onto a pair of elevator trays. If a previously loaded carriage moves onto the bridge 200 from the elevator while the elevator is at the on-elevator position, the carriage 220 will be empty of collimators. For a given level aligned with the carriage 220, as the elevator rack 275 moves up from an on-carriage position to an on-elevator position, any collimators on the carriage 220 will be transferred to a pair of elevator trays at the given level. For any given level aligned with the carriage 220, as the elevator rack 275 moves down from an on-elevator position to an on-carriage position, any collimators on trays at the given level will be transferred to the carriage 220.

Figure 2B:
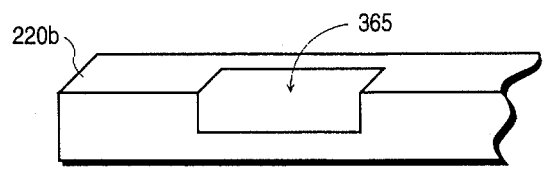
FIG. 2B is an illustration of the inner wall of the lower carriage segment to show one of the four notches that support a collimator within the lower carriage segment.

FIG. 2B is an inner view of one of the corners of the lower carriage segment 220b and illustrates one of the four notches 365 that will hold the four collimator mounting shafts when a collimator is being carried by the lower carriage segment 220b. The notch 365 is a ridge cut into the carriage wall. It is appreciated that there is a separate notch 365 on each inner corner of the carriage segment 220b to support each mounting shaft of the suspended collimator. It is appreciated that the slot 365 is slanted to force the collimator to the left.

Figure 3A:
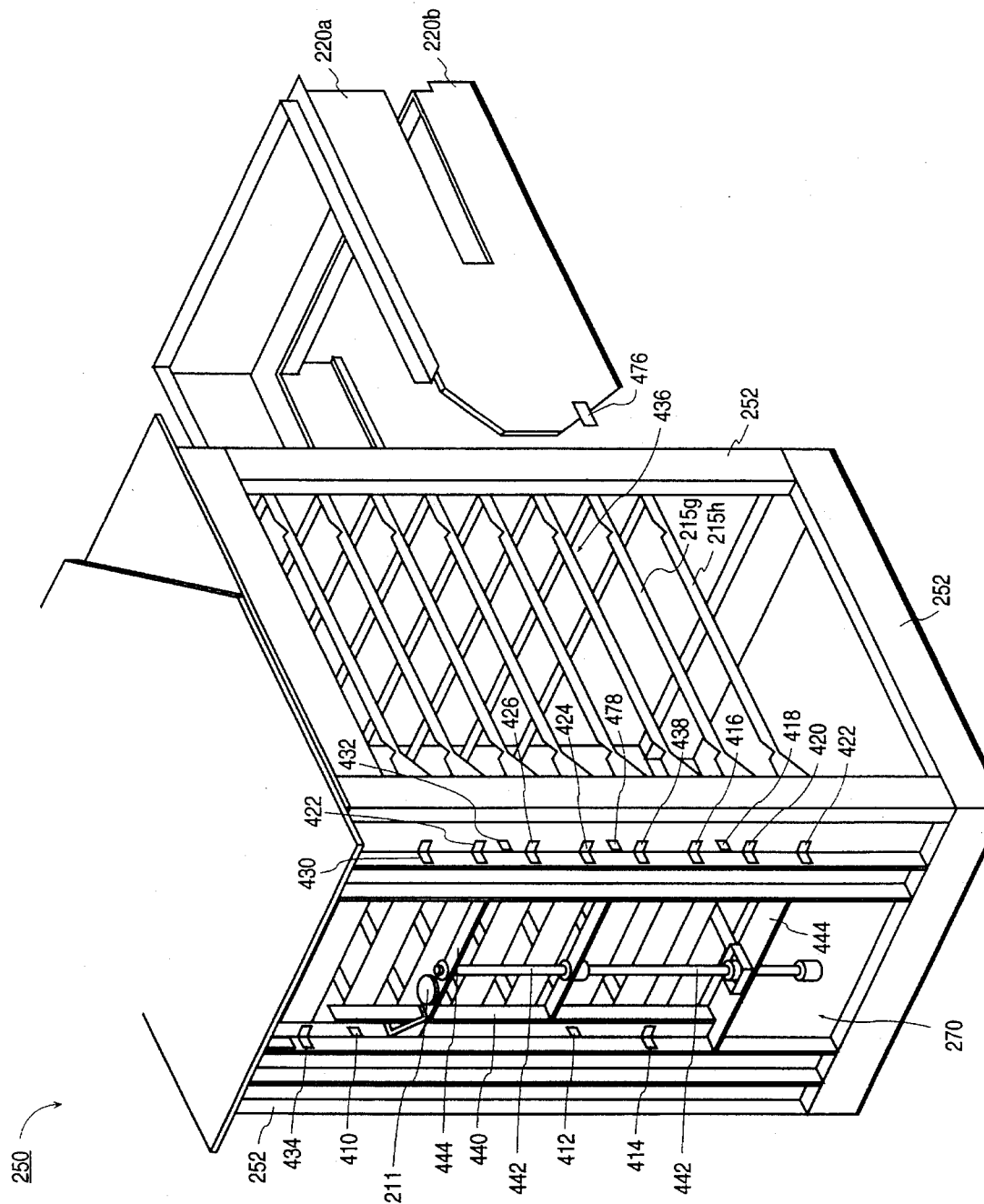
FIG. 3A is an illustration of the back view of the elevator unit of the present invention.

Refer to FIG. 3A which illustrates the back side of the exchanger assembly 250 of the present invention. The elevator rack 275 is composed of the elevator lead screw 442 which is supported by elevator cross-plates 444, which transfer the elevator load to the frame 252. The elevator lead screw and nut and cross plates are attached to the elevator 275 which displaces the 8 trays 215a–215h up and down within the elevator assembly 250. A potentiometer 211 coupled to monitor the lead screw 442 monitors the position of the elevator 275 and reports to the MPU 1076. The elevator bar lead screw 442 is driven by a large motor and is mounted to raise or lower the elevator assembly 275 which consists of elevator channels 440 coupled to the trays 215. The elevator frame 252 (secured to the floor) is stationary with respect to the elevator rack 275. The elevator lead screw 442 moves the trays 215 of the elevator rack 275 up and down to the different levels and the on-carriage or on-elevator positions for each level. The elevator lead screw nut and cross plate couple the elevator lead screw 442 to the trays of the elevator rack 275. The base of the exchanger assembly 250 is shown as 270. FIG. 3A also illustrates sensors of the present invention that are used to monitor the position of the elevator rack 275. The exchanger assembly 250 of the present invention includes a potentiometer 211 for direct elevator position feedback and eight optical sensors (422, 420, 416, 438, 424, 426, 428, and 430) for verifying the height of the elevator rack 275. Each of the eight optical sensors is mounted on the elevator frame 252 and is tied into the elevator MPU 1076 for status communication. There are also two safety sensors 414 and 434 for limiting maximum and minimum elevator travel which are mounted on the frame 252 of the exchanger assembly 250. The signal outputs of these optical sensors 414 and 434 are coupled directly into the motor 277 (see FIG. 4A) and enable circuitry that control the upward and downward movement of the elevator rack 275 and, if triggered, the sensors 414 and 434 immediately stop motor 277.

There are two sensed positions of the elevator rack 275 for each of the four pairs of elevator trays 215a–215h. That is to say, each level has a sensed positioned for the on-carriage position and for the on-elevator position. These sensed positions are roughly 60 mm apart and correspond to positions of the elevator rack 275 when pairs of collimators are on the trays of the elevator rack 275 or on the carriage 220. This is the case because the elevator rack 275 displaces 60 mm to transfer pairs of collimators between the elevator trays of given level and the carriage segments 220a and 220b. There are 60 mm separation between the on-carriage and on-elevator positions for a given tray level. Therefore, given the optical sensor configuration of FIG. 3A, the present invention may determine: (1) which pair of trays of the four levels are aligned with the carriage; and (2) if the elevator is in the on-elevator position or in the on-carriage position. All of this information is tied into the exchanger MPU 1076.

Metal flags located at 410 and 412 on the elevator rack 275 are used by the present invention to trigger the optical sensors 434 and 414 respectively. There is an on-carriage metal flag 418 mounted on the elevator rack 275 which triggers optical sensors 422, 420, 416 and 438 to indicate that the elevator is in the on-carriage position for a given or selected level (0–3). There is an on-elevator metal flag 432 mounted on the elevator rack 275 which triggers optical sensors 424, 426, 428 and 430 to indicate that the elevator is in the on-elevator position for a given or selected level (0–3).

FIG. 3A also illustrates sensors of the present invention for monitoring the position of the carriage 220 along the gear track 231 of the bridge 200. There is one optical limit sensor 478 for limiting the motion of the carriage 220 from traveling too far into the elevator rack 275. A metal flag 476 is located on the rear side of the carriage 220 and this flag is used by the present invention to activate the optical limit sensor 478. The carriage segment 220a and 220b are also shown.

Figure 3B:
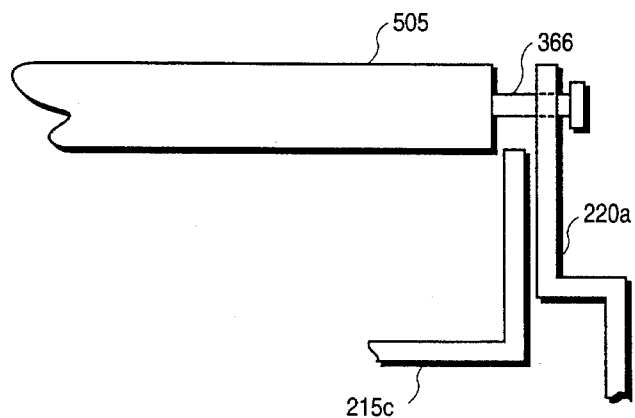
FIG. 3B is a view along the long dimension of the bridge and illustrates the on-carriage position of the elevator.
Figure 3C:
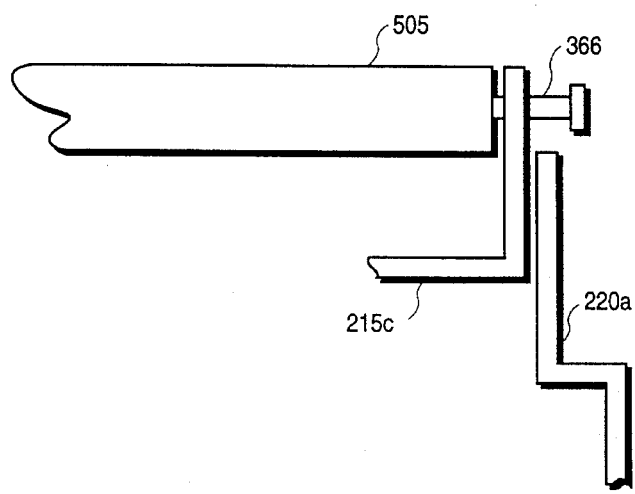
FIG. 3C is a view along the long dimension of the bridge and illustrates the on-elevator position of the elevator.
Figure 3D:
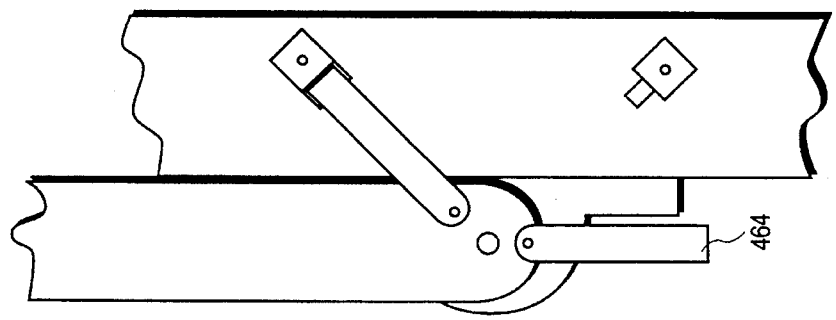
FIG. 3D is a view of the inner side of the elevator frame illustrating bridge arm sensors.
Figure 3D:
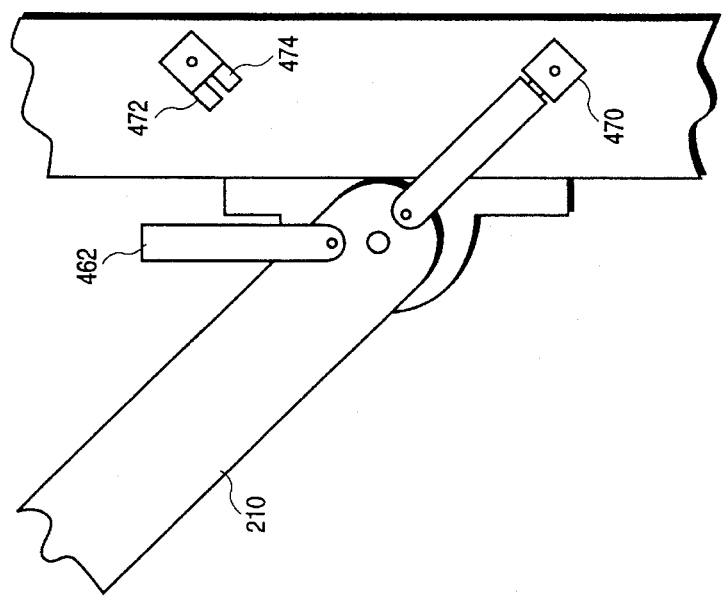

FIG. 3D illustrates sensors of the present invention that are used to monitor the position of the draw bridge mechanism 200. FIG. 3D is a view of the inner side of frame 252 located under the bridge arm 210. Two optical sensors 472 and 470 for detecting the position of the bridge 200 and optical sensor 474 is for limiting the extent of vertical (minimum) bridge travel are provided on support brackets. Sensor 470 is also used for position limiting. Optical sensors 472 and 470 indicate, respectively, when the bridge is in the vertical position or when the bridge is in the horizontal position by monitoring the position of the bridge support 210. Sensor 474 is located on the same bracket as sensor 472 and is a fail safe sensor that will cut power to the bridge motor 1037 (FIG. 10A) if activated by detecting when the bridge 200 is at the minimum limit (e.g., most vertical position). One flag 462 (the vertical flag) on the bridge drive arm 210 activates sensors 474 and 472. Another flag 464 (the horizontal flag) on the same drive arm 210 activates sensor 470. Sensor 470 is also a sensor that will cut power to the drive motor 277 of the bridge 200 if the bridge is detected as extending over its maximum horizontal position. The above sensors are further tied into the exchanger MPU 1076 for status communication. There is also a potentiometer driven by gears off of the bridge support pivot shaft.

Table I below indicates the status of the collimator exchanger as detected and reported by the given sensors illustrated in FIG. 3A and FIG. 3D. It is appreciated that those sensors of the present invention that are not optical or Hall effect sensors are potentiometers which generate a signal output voltage proportionate to the amount of mechanical motion experienced by the sensor. It is appreciated that there are commercially available a number of sensor types and that those discussed here specifically are for illustrative purposes. The sensors may be implemented by a number of different technologies that are within the scope and spirit of the present invention.

TABLE I

| Sensor Label | Motion Position |
| --- | --- |
| 422 | Elevator at Level 0 On-Carriage |
| 420 | Elevator at Level 1 On-Carriage |
| 416 | Elevator at Level 2 On-Carriage |
| 438 | Elevator at Level 3 On-Carriage |
| 424 | Elevator at Level 0 On-Elevator |
| 426 | Elevator at Level 1 On-Elevator |
| 428 | Elevator at Level 2 On-Elevator |
| 430 | Elevator at Level 3 On-Elevator |
| 434 | Elevator at Max Limit |
| 414 | Elevator at Min Limit |
| 472 | Bridge is Vertical |
| 474 | Bridge at Min Limit (Vert.) |
| 470 | Bridge at Horiz Limit (Max) |
| 478 | Carriage in Rack at Min |

FIG. 3B is a cut away view from along the long axis of the bridge into the elevator when the carriage 220 is placed within the elevator rack 275 and frame 252. A given tray 215c and the carriage segment 220a are shown in the on-carriage position. A collimator 505 is shown supported by the carriage by the mounting shafts 366. In the on-carriage position, the carriage 220a may enter the elevator to deposit the collimator 505. FIG. 3C is the same view along the long axis of the bridge 200 into the elevator when the carriage 220 is placed within the elevator rack 275. The on-elevator position of the elevator rack 275 is illustrated. As shown, the carriage segment 220a remains in a constant vertical position as the tray 215c is raised up by the elevator rack mechanisms. This causes the tray 215c to pick up the collimator 505 via the four mounting shafts 366 that protrude from the corners of the collimator (a single shaft 366 is shown). In this position the carriage can go out empty or come in empty (to pick up collimators).

Figure 4A:
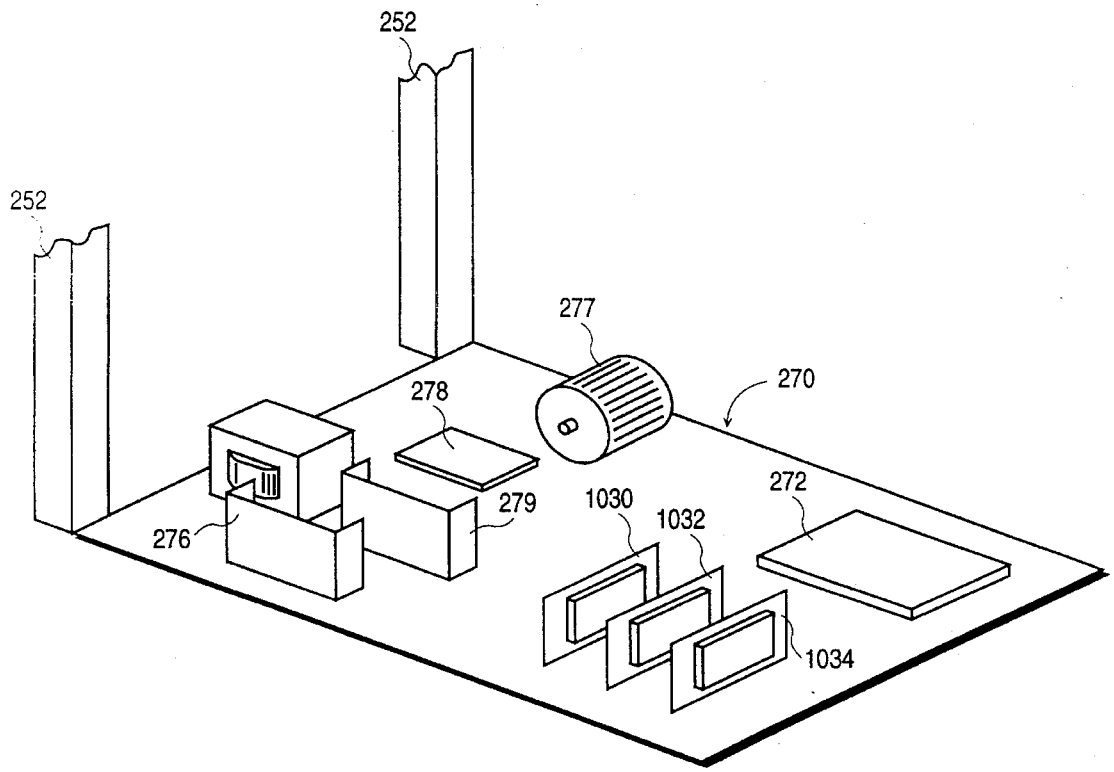
FIG. 4A illustrates the components installed in the base of the elevator unit of the present invention.

FIG. 4A illustrates the components of the base panel 270 of the elevator unit 250 of the present invention. The base panel 270 houses two power supply units 276 and 279 which power the exchanger MPU, sensors, and other control circuitry. A brake controller circuit 278 is also included on the base 270 for controlling the braking of the carriage 220. There are three separate controllers within the present invention that control the elevator rack 275, the carriage 220, and the bridge 200; these controllers are 1030, 1032, and 1034, respectively, as shown in FIG. 4A. These are hardware controllers that are under software direction. It is appreciated that a number of well known and commercially available controller units may be utilized to perform the required hardware control. The base panel 270 also includes a motor 277 for controlling movement of the elevator structure 275. There is also located at 272 a controller for the exchanger MPU communicating with the gantry structure 260 (shown in FIG. 1A) and exchanger assembly 250 including the communication of sensor status. Part of the frame 252 of the exchanger assembly 250 is also shown in FIG. 4A.

Figure 4B:
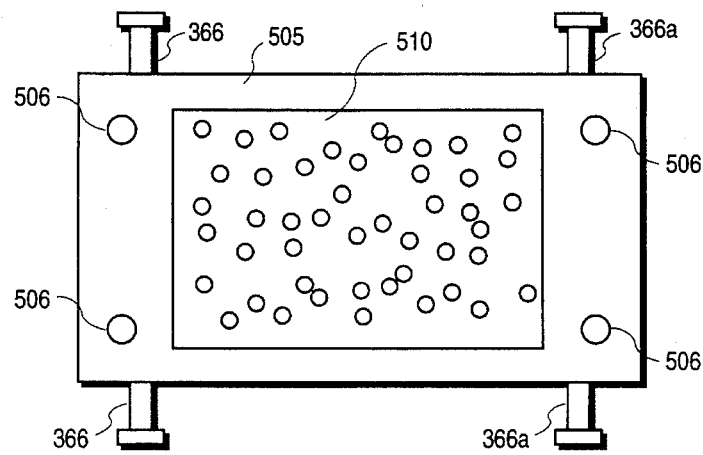
FIG. 4B is an illustration of a collimator as used in the present invention.

FIG. 4B illustrates a detector side view of a collimator 505 as used within the present invention. The collimator 505 contains an imaging area 510 composed of a plurality of, deep, narrow through holes distributed throughout the rectangular area. Located at the peripheral corners of the collimator are the four receiving holes 506. Also, there are two mounting shafts 366 and 366a on both sides of the collimator 505 which are used to support the collimator and aid in transfer operations between the carriage 220 and the trays of the elevator rack 275 and between the carriage 220 and the detector heads 10 and 12.

Figure 4C:
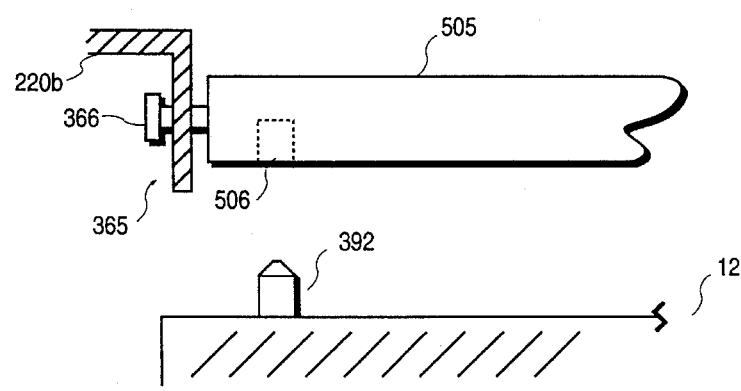
FIG. 4C illustrates the support structure utilized by the present invention to securely contain a collimator within the lower segment of the carriage.

FIG. 4C illustrates the support structure used by the present invention to securely hold a collimator 505 within the collimator segment 220b. A cut away view of segment 220b is shown and notch 365 is shown with more clarity. It is appreciated that there are two notches 365 on either side of the carriage segment 220b so that each mounting shaft 366 of the collimator 505 has its own notch for support. The notch 365 couples to hold the mounting shaft 366 under the force of gravity. Also shown in FIG. 4C is a side view of the lower detector 12. A protruding conical pin 392 is illustrated associated with the detector surface. As shown in the side view, the pin 392 is aligned with the side view of one of the receiving holes 506 of the collimator 505. This pin 392, as well as others located on the detector surface, will enter the receiving holes 506 of the collimator 505 when the collimator is mounted onto the detector head 12 and will prevent the collimator 505 from sliding. Two conical pins may be placed diagonally on the detector head.

Figure 5:
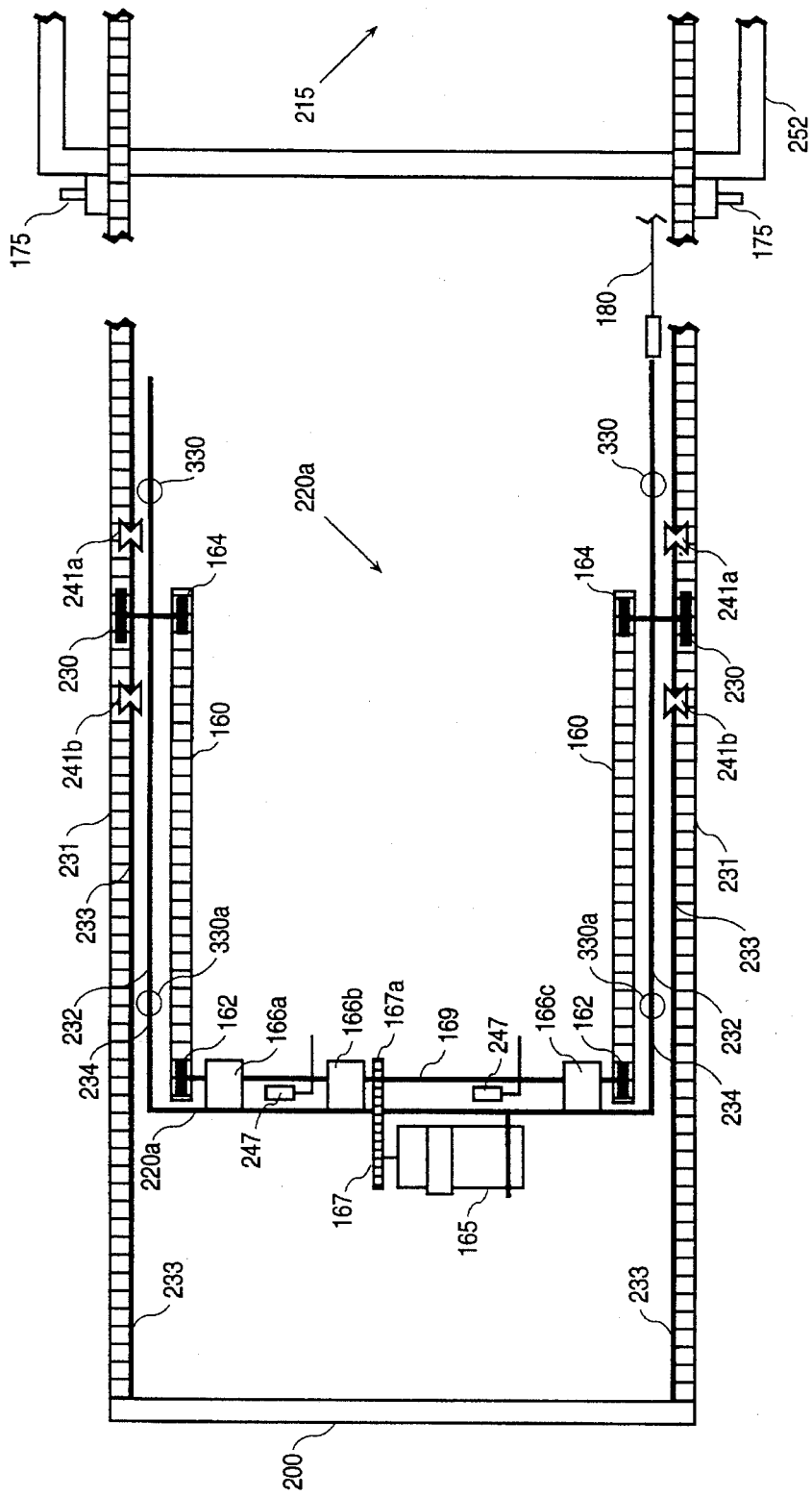
FIG. 5 is a top orthogonal view of the carriage of the present invention when the carriage is positioned on the extended bridge.

Refer to FIG. 5 which illustrates a top cut away view of the carriage segment 220a of the present invention in an intermediate position along the bridge 200 and out side of the exchanger frame 252. The bridge 200 of the present invention is in the horizontal position. As shown, there is no collimator located within the carriage segment 220a and it is empty. The frame of the exchanger is shown as 252. Pivot bearing supporting the bridge 200 to the exchanger frame 252 are shown as 175 on either side of the ridged gear track 231. There are two gear tracks 231 on both sides of the carriage structure. Running along each gear track 231 is also located a V-track 233. The top view of both gear wheels 230 is illustrated as well as the upper set of V-groove wheels 241a and 241b which are located on both sides of the carriage. The outline of the carriage segment 220a is also illustrated. When viewed from the top as shown, the carriage is "U" shaped without any cross members along the back so that it can fit around the elevator rack 275. A connecting flexible ribbon cable 180 is coupled between the carriage 220 and the exchanger assembly 250 to convey positioning controls from the exchanger assembly 250 and also to relay sensor data from the carriage 220 to the exchanger assembly 250. As the carriage moves from inside the exchanger frame 252 to the end of the bridge 200 and back, the flexible ribbon cable 180 extends out as to follow the carriage 220. The carriage 220 is powered by an electric motor 165 receiving power via the interface ribbon cable 180. The motor 165 is positioned outside the carriage 220 in the front (facing the gantry 260) in order to clear the elevator rack 275 when the carriage 220 is situated within the exchanger assembly 250. By locating and mounting the motor 165 on the front, outside the carriage frame, and by running the drive chains 160 along both sides of the periphery of the carriage as more fully described to follow, the carriage motor 165 of the present invention is well clear of the detector heads 10 and 12 during an exchange operation and is also clear of the elevator rack 275 when the carriage is exchanging collimators with the elevator rack 275. The present invention advantageously locates the carriage motor 165 in this position.

The motor sprocket 167 of carriage motor 165 is coupled to a chain 170 which transfers energy to an inner sprocket 167a which is attached to a cross shaft 169. Shaft 169 is supported by three brackets 166a, 166b and 166c which support the shaft 169 with bearings that allow the shaft to transfer the energy from sprocket 167 to sprocket 167a and to the two sprockets 162 on either side of the carriage segment 220a. The sprockets 162 couple two separate drive sprockets 164 via intermediate chains 160. The drive sprockets 164 are directly coupled via central axis to the ridged gears 230 which are in turn meshed to the gear track 231.

The gear ratio between gear 230 and drive sprocket 164 is approximately 1:1. It is appreciated that the drive sprockets 164 and 162 are on opposite (the inside) sides of the carriage compared to the ridged gear 230 (the outside) for a given side of the carriage segment 220a. In the preferred embodiment of the present invention, the chain 160 and the drive sprockets 164 and 162 are within the metal side plates of the carriage on both sides of the carriage segment 220a and located out of the way of users. In this fashion, the drive mechanism is sufficiently located out of the way from the collimators which will be placed inside the carriage segment 220a and 220b. Two potentiometers 247 are mounted to monitor the position of the carriage along the geared track 231 and report to the exchange MPU 1076. A motor cover may be placed to surround motor 165 for protection. It is preferred to locate a cover over gear 230 to protect a user.

FIG. 5 also illustrates the approximate positions of the push plates 234 and the guide blocks 232 which are all securely mounted onto the top portions of the carriage segment 220a and are stationary with respect to the carriage. FIG. 5 also illustrates the positions of the two notches 330 of carriage segment 220a and of the two notches 330a of carriage segment 220a which are used to hold and locate a collimator (via the four mounting shafts of the collimator) when placed into the carriage segment 220a. It is appreciated that notches 365 (not shown in FIG. 5) are similarly located on both sides of the lower carriage 200b to hold and locate a collimator for the lower detector head 12. It is appreciated that while the push plates 234 and guide blocks 232 for carriage segment 220a are located near the top portion of the upper carriage segment 220a, push plates 236 for carriage segment 220b are located near the bottom portion of the lower carriage segment 220b.

Figure 6:
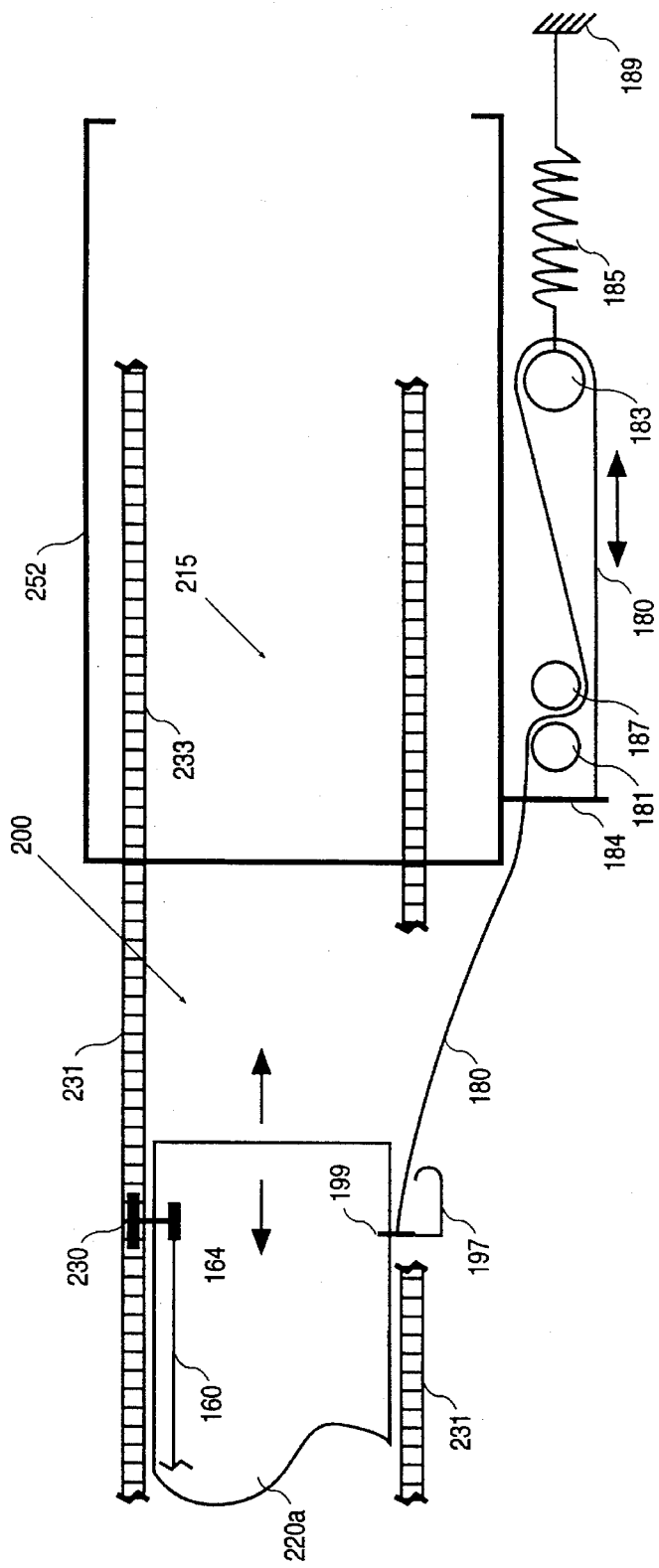
FIG. 6 is a top orthogonal view of the carriage illustrating the ribbon cable extension and retraction system of the present invention.

FIG. 6 illustrates the ribbon cable 180 feed mechanism of the present invention that controls the extension and retraction of the flexible ribbon cable 180 during carriage movement along the bridge 200. The bridge 200 of the present invention, as shown, is in the horizontal position. The carriage 220 is shown as positioned onto the bridge 200 and out of the exchanger assembly 250. The ribbon cable 180 couples the carriage components (motor, sensors, etc.) to the components (controllers) of the exchanger assembly 250 via connector 199 and specifically couples to the MPU unit of the carriage 220 which feeds the ribbon cable to various sensors on the carriage 220 as well as the carriage motor 165. Attached adjacent to the clamp 199 is a curved relief or bracket 197. The gear track 231 is shown in FIG. 6 as running along the bridge 200 and the inner portions of the exchanger assembly 250. When the carriage is on the bridge, the ribbon cable 180 runs from the fixed connector 199, along the inner curved side of the curved relief 197 and around a fixed roller 181. Then the ribbon is run around a fixed roller 187 and around a second movable rotating roller 183 and clamped to the frame 252 at a second fixed connector 184 which couples signals from the ribbon cable 180 to components located in the base panel 270 of the exchanger assembly 250.

The movable rotating roller 183 is attached to a sliding mount which is pulled by an extended spring 185 which is attached to a fixed position on the elevator frame 252 at position 189. The spring 185 and the movable roller act to maintain tension on the ribbon cable during movements of the carriage. However, because the length (the dimension that runs along the axis of the gear track 231) of the exchanger assembly 250 is smaller then the length of travel of the carriage 220 along the bridge 200, a system to "double back" the ribbon cable is supplied in the present invention which includes curved bracket 197 and rollers 181, 187 and 183. For instance, when the carriage 220 is on the bridge 200, as shown in FIG. 6, and is moving away from the exchanger assembly 250, then the ribbon cable 180 is being pulled away from frame 252, the cable 180 wraps between roller 181 and 187, roller 183 turns counter-clockwise, the roller 183 is being pulled to follow the motion of the carriage 220 and the spring 185 is consequently being extended. When the carriage 220 is on the bridge 200 in roughly the same position but moving toward the exchanger assembly 250, then the ribbon cable 180 is being pulled by the spring 185 toward the frame 252, roller 183 turns clockwise, the ribbon wraps between roller 181 and roller 183, the roller 183 is being pulled toward frame 252 by the spring 185 and the spring 185 is consequently being relaxed.

With reference to FIG. 6, when the carriage 220 of the present invention is moving on the bridge 200 but toward the exchanger assembly 250, at some point the curved relief bracket 197 of the carriage will reach the roller 181 of the frame 252 as the carriage 220 begins to enter the threshold (enclosure) of the exchanger assembly 250. At this point (as the carriage moves into the elevator) the ribbon cable 180 will become wrapped around the outer edge of the curved relief 197 and will no longer be wrapped around roller 181 but rather will be wrapped around roller 187, the roller 183 will change rotation from clockwise to counter-clockwise and the motion of the roller 183 will change from moving in the same direction as the carriage 220 to moving in an opposite direction as the carriage 220. When the carriage 220 is fully within the elevator, the spring 185 will be extended because the carriage 220 will have pulled roller 183 toward fixed roller 187. As the carriage 220 moves from within the elevator rack onto the bridge, the spring 185 pulls the movable roller 183 away from roller 187 and takes up the slack of the ribbon cable (the ribbon cable wrapping around relief 197) until the relief bracket 197 clears the threshold of the roller 181. At this point, as the carriage 220 exits the elevator rack, the ribbon 180 becomes wrapped between roller 181 and 187 (as shown in FIG. 6), is released from relief 197, spring 185 changes from being relaxed and pulling to becoming extended and pulled.

In this way, the rollers, relief and spring mechanism of the present invention provide a doubling back capability when the relief bracket 197 crosses the elevator rack threshold to provide a steady extension or retraction of the cable 180 to prevent the cable from blocking the flow of the carriage 220 along bridge 200. When the carriage connector and curved relief bracket 197 crosses the elevator threshold, the ribbon supply will reverse its direction causing the excess ribbon cable (around rollers 183 and 187) to reverse direction. This action will keep the supply of flex ribbon in close alignment with the motion of the carriage even though the elevator length is not as long as the displacement of the carriage 220 along gear track 231. It is important to the present invention that this flexible ribbon cable 180 be kept tightly aligned with the movement of the carriage 220 because the carriage 220 is transporting a great deal of weight and if the cable should become caught up on any portion of the exchanger assembly 250 or of the gantry 260, the cable 180 or one of the connectors would become torn or broken which would cause a complete system malfunction. Because the exchange operations of the present invention are fully automatic, there must be a reliable method of preventing such ribbon cable malfunction. Further, because collimator exchange operations may be performed routinely, there must also be a reliable method and mechanism for providing ribbon cable control.

FIG. 7 is a more detailed side view of the sliding lock plates 253 and 255 of one side of the detector heads 10 and 12, respectively in the unlocked position. The sliding lock plates function to secure the collimators to the detector heads and also function, when pushed by the carriage, to allow the collimators to be transferred between the detector heads and the carriage segments 220a and 220b. It is appreciated that the sliding lock plates 253 and 255 are attached to the sides of the detector units 10 and 12 via eccentric rollers 320, 320a, 370, and 370a and are not attached to the carriage structure. The locking plates are constantly pulled in the closed and locked direction by inner springs as shown. Safety latch pins 315 and 360 are mounted on detector heads 10 and 12, respectively, and act to secure the sliding lock plates when the plates are in unlocked or locked positions. The latch pin 315 of the present invention has an internal spring pushing the latch pin downward so that at rest the latch pin resets in groove 316 or 317 (depending if the sliding lock plate 253 is unlocked or locked). When the latch pins are unlatched, the sliding lock plates 253 and 255 are free to be driven between locked and unlocked positions by the carriage. When the sliding lock plates 253 and 255 are in the locked position, the latch pins and springs, as well as other components of the present invention, prevent collimator separation.

The sliding lock plate pair 253 (one on each side of detector head 10) and pair 255 (one on each side of detector head 12) are used by the present invention so that a pair of collimators loaded within the carriage segments 220a and 220b may be securely fastened to the detector heads simultaneously. Also, a pair of collimators may be transferred from the detector heads to an empty carriage segment 220a and 220b simultaneously. Via specialized mechanisms and methods, as described herein, the present invention may transfer a pair of collimators between the detector heads and trays of carriage 220 simultaneously. It is appreciated that the flanged rollers 320 and 320a and also mounting shafts 336 and 336a are eccentric about their pivot axis in that each may be manually adjusted or calibrated to a specific position so that the collimators are held firmly to the detector head without any clearance. The same is true for rollers 370 and 370a of sliding lock plate 255 and 366 and 366a. These rollers and shafts are eccentric so that fine alignment may be achieved between the components of the present invention.

FIG. 7 illustrates the side view of sliding lock plate 253 (in the unlocked position) as if aligned on top of the carriage segment 220a (not shown) and when the carriage contains a collimator for transfer between the detector 10 and the carriage segment 220a. When the detector head 10 is free of a collimator, the sliding lock plate 253 is in the position as shown (unlocked with latch pin 315 in groove 316) and the spring pulling the sliding lock plate 253 to the right. The sliding lock plate pair 253, mounted on the sides of the upper detector head 10, is spring loaded and may move right or left and as shown in FIG. 7, will be pulled to the right under the action of the spring when relaxed. As shown in FIG. 7, the sliding lock plate is in the unlocked position held by latch pin 315. Rollers 320 and 320a secure the lock plate 253 to the side of the detector head 10 within two slots 322 and 322a, respectively. Mounting shafts 336 and 336a are located on one side of the collimator within carriage segment 220a. These shafts 336 and 336a are resting in notches 330 and 330a of the carriage segment 220a, respectively, before the collimator is affixed to the detector head 10. The shafts will be captured by hooks 328 and 328a when locked. Magnetic sensors 310' and 310a' (Hall effect sensors) mounted on the sides of the detector are triggered by magnets 310 and 310a attached to the sliding lock plates in order to detect the two states of the sliding lock plate between the locked state (to the right) and the unlocked state (as shown in FIG. 7). These magnets are mounted on the sliding lock plate 253 and slide between two fixed positions relative to the detector head 10; corresponding sensors 310' and 310a' are placed on the detector heads so as to sense the locked (via sensor 310a') and unlocked (via sensor 310') positions of the plates. Movement of the carriage 220 will lock or unlock the sliding lock plate 253. Drive block 393a extends from the side of plate 253 and interfaces with guide block 232 and push plate 234 of carriage segment 220a so that the carriage segment 220a may unlock sliding lock plate 253 when detector head 10 interfaces with carriage segment 220a. Push plate 234 interfaces with drive block 393a to lock the plate 253 in conjunction with the spring.

In operation, to install a collimator to detector 10 from carriage segment 220a, after the carriage segment 220a is loaded with a collimator and rolls onto the extended bridge 200 underneath the empty detector head 10 (at zero degrees on the gantry 15) into an unlocked carriage position, the detector head 10 is lowered radially toward the carriage segment 220a. In the unlock carriage position, the shafts 336 and 336a are not positioned within hook 328 or hook 328a, respectively. The push plate 234 of the carriage segment 220a, when the detector head 10 becomes close enough, the push plate remains vertically stationary and prevents the latch pin 315 from moving in with the locking plates and therefore the latch pin 315 displaces out of the groove 316 to a position marked as 315' clear of the groove 316. With the latch pin 315 moved out of groove 316, the sliding lock plate 253 is free to move right but is held in place by guide block 232 on carriage 220a. The carriage segment 220a will then move along gear track 231 toward the elevator rack 275 and the push plate 234 will drive the drive block 393a forcing the hooks 328, 328a over the shafts 336, 336a, respectively. The collimator will not slide laterally since conical pins are inserted into alignment holes 506 of the collimator (see FIG. 4C). In this configuration, the latch pin 315 will be located over groove 317, but not within groove 317 because of the presence of the push plate 234. This is the locked position. When locked, the rollers 320 and 320a will be on the left side of slots 322 and 322a, respectively and the sliding lock plate 253 and carriage segment 220a will have moved right relative to the collimator. The sliding lock plate 253 is moved right or left by action of the carriage 220 as it runs along gear track 231 when the detector head 10 is interfaced with the carriage while the detector 10 and the collimator remain stationary. The presence of conical pins 391 and 391a (which are disposed at two diagonally opposite corners), protruding from the imaging surface of the detector 10 into receiving holes of the collimator, prevent the collimator from sliding laterally during the locking procedure and during a clinical imaging session.

After locking, the detector head 10 will slowly radius upward under direction of the gantry 260 and pull away from the push plate 234 thus allowing the latch pin 315 to lock into groove 317 under spring action and also pulling (via hooks 328 and 328a) the collimator out of the carriage segment 220a (e.g., pulling the collimator out of notches 330 and 330a). The latch pin in groove 317 prevents the sliding lock plate 253 from moving left relative to the collimator that is locked to detector head 10 and acts as an additional safety mechanism of the present invention to prevent collimator separation from the detector head 10. A magnetic (Hall Effect) sensor signal whether latch pins are latched or unlatched. It is appreciated that at any time during detector movement, e.g., during an imaging session or otherwise, if the latch pins 315 or 361 should become unlatched, the gantry system will restrict further detector head and gantry motion. Also, if the lock sensed by 310a' or 375a' fails the gantry system will restrict detector motion. The dashed line within the sliding lock plate 253 represents the imaging surface of the detector head that will receive the surface of the collimator from carriage segment 220a. It is appreciated that there is a separate sliding lock plate on both sides of the upper detector head 10 and that both operate in substantially the same way as discussed above, except that one is a mirror image of the other. Each controls the locking and unlocking of the mounting shafts of the collimator on one side to the receiving hooks of the sliding lock plates for that side.

FIG. 7 illustrates the sliding lock plate 255 of the lower detector head 12 in the unlocked position. Since the collimator 505 of carriage segment 220b is aligned above the lower detector head 12, the sliding lock plate 255 is configured to accept the collimator mounting shafts 366 and 366a from the top. There are two sliding lock plates 255, one on either side of the detector head 12. As shown, the sliding lock plate (facing) is fastened to the detector head 12 via eccentric rollers 370 and 370a within slots 374 and 374a. Mounting shafts 366 and 366a are from the collimator that is supported by carriage segment 220b. When the detector head 12 is located along the gantry at 180 degrees (along the gantry 260) it is raised radially by the gantry 260 to meet the carriage segment 220b. As head 12 is raised radially, the collimator 505 is picked up by the head 12 and fits over the align pins 392.

The detector 12 is raised further and the bottom edge of the carriage segment 220b prevents the latch pin 360 from moving with the detector and displaces latch pin 360 from groove 372 into position 360' so that the sliding lock plate 255 is free to slide right or left. However, the drive plate 236 on the carriage segment 220b (see FIG. 1B) contacts the block 393b (connected to the lock plate 255) and prevents the lock plate 255 from moving to the right. When aligned, shafts 366 and 366a of the collimator 505 are aligned to fit into receiving hooks 373 and 373a of sliding lock plate 255. These shafts 336 and 336a are no longer resting in notches 365 and 237 of the carriage segment 220b because the collimator of carriage segment 220b is resting on the detector head 12. The sliding lock plate 255 has a spring that forces the bar towards the locked position (e.g., pull the bar to the right) when the sliding lock plate 255 is at rest. The latch pin 360 has an internal spring that forces the pin upward into groove 372 or 361 (e.g., if unlocked or locked) when at rest. The sliding lock plate 255 is moved right or left by action of the carriage 220 as it runs along gear track 231 when the detector head 12 is interfaced with the carriage 220. The collimator 505 will not slide relative to the detector head 12 due to the conical alignment pins 392 and 392a which are inserted into the collimator alignment holes 506. Drive block 393b interfaces with drive plate 236 of carriage segment 220b so that the carriage segment 220b may move sliding lock plate 255 to the locked or unlocked position, and the spring assists in forcing the plate 255 to the locked position.

When locked, the mounting shafts 366 and 366a are positioned into hooks 373 and 373a, respectively, by carriage movement along gear track 231 (and V-track 233) to the right. At this point, the latch pin 360 will be positioned under groove 361 and the detector head 12 is moved radially down about 1.2 cm so that the latch pin 360 will be inserted (by spring action) into groove 361 and act as a safety latch to prevent collimator separation and also to latch the slide plate 255 locked. At locking, movement of the slide plate 255 will roll the slots across the rollers 370 and 370a so that the left side of slots 374 and 374a contact the rollers. The carriage 220 will then move toward the elevator frame 252 after the plate 255 is locked and latch pin latched to clear the detector 12. Once clear, the detector 12 can radius to any position.

Magnetic sensors 375' (Hall effect sensor) and 375a' located on the detector 12 in conjunction with corresponding magnets 375 and 375a located on slide plate 255 detect the two states of the sliding lock plate 255 between the locked stated (to the right) and the unlocked state. Sensor 375' detects unlocked and sensor 375a' detects locked state. These magnets slide between two fixed positions relative to the detector head 12 wherein sensors 375' and 375a' are located so as to sense the locked and unlocked position. The gantry will stop if these sensors fail. The dashed line within the sliding lock plate 255 represents the imaging surface of the detector head that will receive the surface of the collimator from carriage segment 220b. It is appreciated that there is a separate sliding lock plate on both sides of the lower detector head 12 and that both operate in substantially the same way as discussed above, except that one is a mirror image of the other. Each controls the locking and unlocking of the mounting shafts of the collimator on one side to the receiving hooks of the sliding lock plates for that side.

As discussed, it is appreciated that the present invention also includes several conical pins that extend upward from the corners of an imaging surface of a detector head. These pins are approximately a one inch extended from the imaging surface of the camera and fit into aligned receiving holes in the corresponding collimator that will mate with the detector head surface (see FIG. 4B and FIG. 4C). This is true for both the upper detector head 10 and the lower detector head 12. The alignment holes 506 and conical pins (such as 392) act to securely fasten and prevent sliding of the collimator and the detector head imaging surface when the sliding lock plates 255 and 253 are locked or unlocked. FIG. 7 illustrates a side view of two of these pins 391 and 391a which are located near opposite corners of the imaging surface of detector head 10. Also shown is a side view of two tips 392 and 392a which are located near two opposite corners of the imaging surface of detector head 12 for the facing side. It is appreciated that each collimator may have two, three, or four such conical pins within the present invention.

The conical pins 391, 391a, 392, 392a of the present invention, when inserted into the receiving holes of the collimator, also prevent the collimator from moving relative to the detector head when the carriage is moved right or left in order to move the sliding lock plates. Therefore, when the sliding lock plates 253 are moved right or left by action of the carriage segment 220a, the rollers 320, 320a and mounting shafts 336, 336a remain stationary with respect to the detector head 10 as the plate moves relative to them. Similarly, when the sliding lock plates 255 are moved right or left by action of the carriage segment 220b, the rollers 370, 370a and mounting shafts 366, 366a remain stationary with respect to the detector head 12 as the plate moves relative to them. When the corresponding mating collimator is aligned for mounting with its respective detector head, alignment holes on the collimator align with these conical pins and when the sliding locking plates are locked, these pins and holes will prevent the collimator from moving side to side relative to the detector head surface. The sliding locking plates prevent the collimators from moving up and down relative to the detector head surface. In such a way, the present invention securely latches the collimators to the detector heads and prevents separation.

Dual Collimator Installation

Figure 8A:
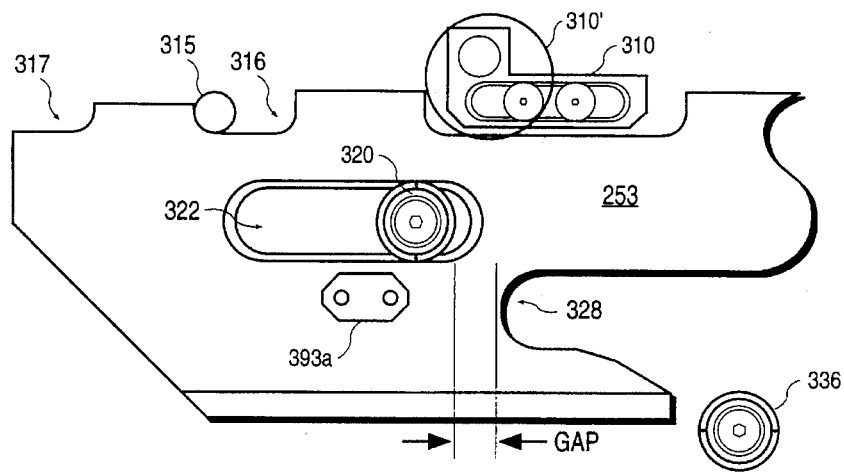
FIGS. 8A, 8B, and 8C illustrate the procedure used by the locking plates of the present invention to install a collimator to a detector head.
Figure 8B:
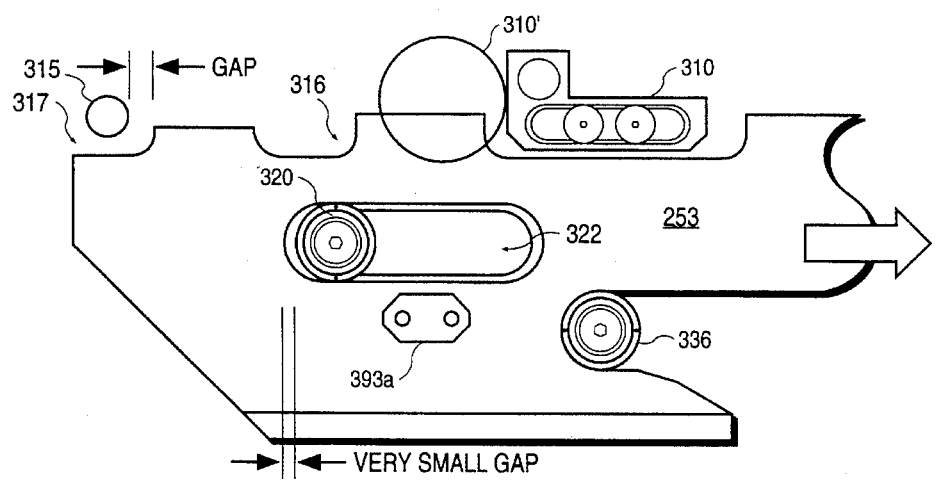
Figure 8C:
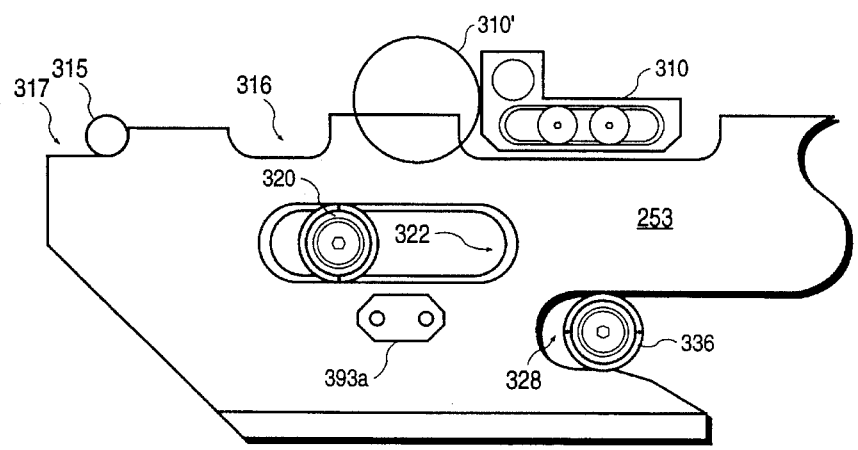

FIG. 8A, FIG. 8B, and FIG. 8C illustrate the major stages of the locking procedure of the present invention used to mount (install) a mating collimator (loaded in the carriage segment 220a) with its respective detector head for the upper detector head 10. The mating procedure for the lower detector head 12 and carriage segment 220b is similar to that of the upper head 10, and where dissimilar the differences will be explained herein. The following descriptions describe the action of one side (the facing side) of the detector unit 10, but it is appreciated that similar actions with analogous components take place concurrently at the non-facing side of the detector head 10 as well.

Refer to FIG. 8A which illustrates the case where the detector head 10 is empty and the sliding lock plate 253 is in the unlocked position and carriage segment 220a is loaded with a mating collimator (represented by bolt 336) and aligned along gear track 231 under detector head 10 (at zero degrees rotation) and detector head 10 is moved radially down to meet the aligned carriage segment 220a. The sliding lock plate 253 is in the unlocked position (with latch pin 315 in groove 316) subsequent to a collimator removal procedure of the present invention. As shown, the safety latch pin 315 is loaded within groove 316 and the sliding lock plate is being pulled to the right by action of a spring. The roller 320 is resting on the right side of slot 322 and mounting shaft 336 of the collimator is out of hook 328 and is positioning to meet the detector head 10. The carriage is run along gear track 231 (and V-track 233) to the unlocked position. The detector head 10 is lowered by the gantry computer system 1085 to meet the aligned carriage segment 220a until the collimator mounting shafts 336 (and 336a) are close to meeting the top of the hook 328 of the sliding lock plate 253. At this position, the conical pins 391 and 391 a will be inserted into the collimator receiving holes 506, thus preventing relative sliding movement of the collimator to the detector head imaging surface. Also at this position, push plate 234 of the carriage segment 220a displaces latch pin 315 out of groove 316 to free the sliding lock plate 253 and push plate 234 also interfaces with drive block 393a. The Hall effect sensors 310' and 310a' report the status of the unlocked position of bar 253.

FIG. 8B illustrates the resultant configuration. The carriage segment 220a of the present invention is moved along gear track 231 of bridge 200 to the drive lock position so that push plate 234 forces drive block 393a, and the sliding lock plate 253, to move right or left (depending on which side is viewed) relative to the detector head 10 in order for the hooks 328 and 328a to grab the mounting shafts 336 and 336a and pull the collimator snugly against the detector 10. The collimator does not move right or left relative to the detector head 10 because of the conical pins 391 and 391a on the imaging surface penetrate the alignment holes of the collimator and prevent such movement. As the carriage 220 moves along the gear track 231, slots 322 and 322a slide to the right across the rollers 320, 320a and the hooks 328 and 328a pick up and hold the collimator mounting shafts 336 and 336a to lock the collimator. Since the latch pin 315 is held upward, the sliding lock plate 253 moves relative to the latch pin 315 (mounted on the detector 10) so that the latch pin 315 is positioned above groove 317. This is the drive lock position of the present invention. Latch pin 315 is not within groove 317 because the push plate 234 is still holding the latch pin 315 upward.

With respect to FIG. 8C, the detector head 10 of the present invention is moved radially upward by the gantry computer system 1085 to clear the carriage segment 220a and push plate 234. When this occurs, the latch pin 315 is allowed to position into groove 317 by spring action which aids in securing the position of the sliding lock plate 253 to prevent sliding. As the detector head 10 moves radially upward, it carries the collimator with it using hooks 328 and 328a, thus lifting the collimator out of the notches 330 and 330a of the carriage segment 220a via mounting shafts 336 and 336a. Once clear of the carriage, the detector head 10 in the locked position is ready to perform a clinical imaging session using the newly installed collimator. The latch pin 315 in groove 317 insures that the plate 253 is locked and prevents the sliding lock plate 253 from moving side to side and the conical pins within the collimator receiving holes also help to secure the collimator to the detector head. The Hall effect sensors 310' and 310a' report the new status of the locked position of bar 253.

While the above installation process is occurring, the lower carriage segment 220b is being used by the present invention to simultaneously install a collimator onto detector head 12 using sliding lock plates 255. This is the case because the lower detector head 12 aligns to meet the lower carriage segment 220b at the same time the upper detector 10 head aligns to meet the upper carriage segment 220a. Therefore, when the carriage 220 moves right or left (along bridge 200) to adjust the sliding lock plates, the sliding lock plates 253 and 255 of both detector heads 10 and 12 are adjusted simultaneously. However, the present invention may also operate such that either detector performs an installation separately.

Refer now to FIG. 7 and the procedure for collimator installation of the lower detector head 12 is explained. Given an unlocked sliding lock plate 255, the detector head 12 is raised by the gantry computer system 1085 radially upward to meet the carriage segment 220b containing a new collimator which is positioned along gear track 231 in the unlocked position. The conical pins 392 and 392a enter the aligned holes of the collimator (located in the carriage) to prevent sliding motion of the collimator relative to the detector head surface. At this time the collimator is lifted out of the carriage segment 220b a small amount by the detector 12. The collimator is lifted out of the carriage by the detector head 12 as the detector head rises. The detector displaces further and the bottom edge of the carriage segment 220b displaces the latch pin 360 out of groove 372 as the detector head 12 is raised radially by gantry 260. The lock plate 255 is held in the unlocked position, however, by lower drive plate 236 acting on the drive block 393b.

While the latch pin 360 is unlatched the sliding lock plate 255 is free to slide (but is held open by the drive plate 236) and the carriage segment 220b is then moved along the bridge 200 and the drive plate 236 drives the locking plate 255 and its hooks 373 and 373a over the collimator mounting shafts 336 and 336a. This is the drive lock position of the carriage. Then, latch pin 360 is directed above but out of groove 361. The detector head 12 moves radially downward (about 1.2) to allow the spring to latch the latch pin 360 into groove 361, but not so far that the collimator mounting shafts 336 and 336a contact the carriage segment 220b. Then the carriage 220 is allowed to move along track 231 toward the exchanger frame 252 to clear the detectors. Then the detector 12 is allowed to radius out to its maximum outward position. At this point the collimator will be securely fastened to the detector head 12 via the sliding lock plate 255 and the conical pins 392 and 392a of the detector head imaging surface which are inserted into the receiving holes on the collimator surface. Sensors 375' and 375a' report the locked and unlocked positions of the sliding lock plate 255 of the detector head 12 as required. During the unlock to lock operation, slots 374 and 374a slide over and relative to the mounting shafts 370 and 370a of the detector head 12.

The carriage 220 is comprised of both carriage segment 220a and carriage segment 220b which are attached together. Therefore, the installation of the collimator on detector head 10 and on detector head 12 occurs simultaneously. Both detector heads 10 and 12 may move radially to meet the carriage 220 at the same time. Motions of the carriage 220 as described above to slide the sliding lock plates (255 and 253) from the unlocked to the locked position for detector heads 10 and 12 occur simultaneously. In such an arrangement, the present invention provides a mechanism and system to simultaneously install two collimators onto two detector heads within the gantry structure 260. It is also appreciated that for single collimator exchange operations, the detector not involved in the exchange will not radius inward toward the carriage. Or alternatively, assuming the appropriate trays of the elevator are empty, one of the carriage segments 220a or 220b may be left empty and the exchange operation will occur regularly by the carriage and the other respective detector head to install a single collimator.

Dual Collimator Removal

Figure 9A:
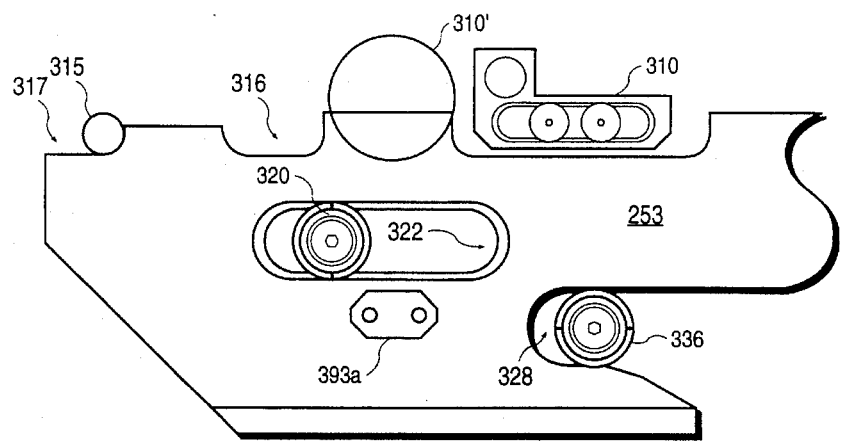
FIGS. 9A, 9B, and 9C illustrate the procedure used by the locking plates of the present invention to remove a collimator from a detector head to the carriage.
Figure 9B:
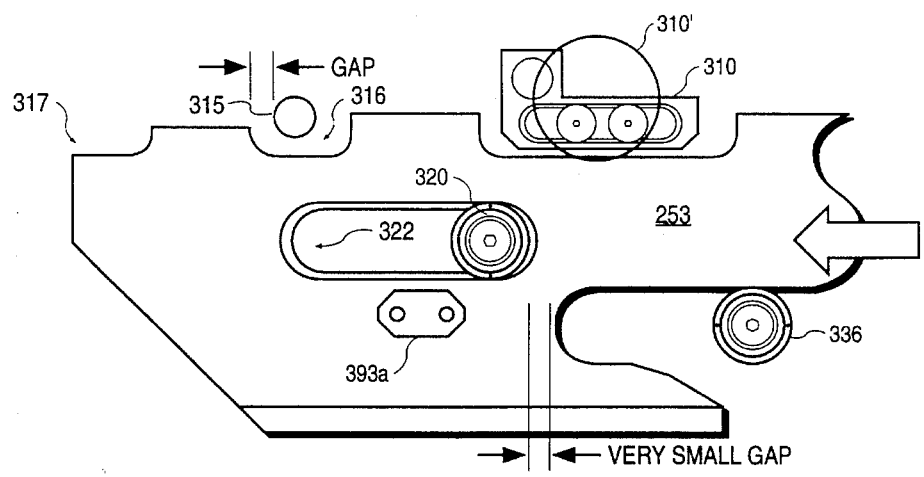
Figure 9C:
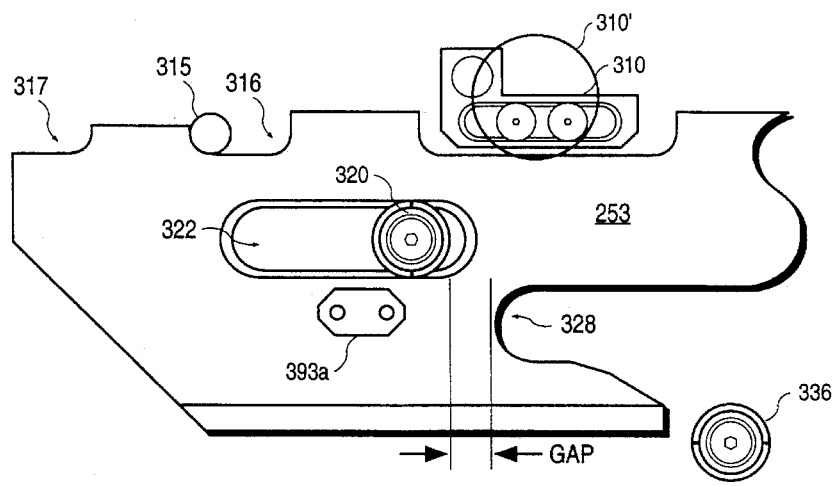

FIG. 9A, FIG. 9B, and FIG. 9C illustrate the major stages of the unlocking procedure of the present invention used to remove a mounted collimator from the upper detector head 10 onto aligned carriage segment 220a. The removal procedure for the lower detector head 12 and carriage segment 220b is similar to that of the upper head 10, and where dissimilar the differences will be explained herein. It is appreciated that the removal process for the detector head 10 and for the detector head 12 occur simultaneously by the present invention. The following descriptions describe the action of one side (the facing side) of the detector unit 10, but it is appreciated that similar actions with analogous components take place concurrently at the non-facing side of the detector head 10 as well.

Refer to FIG. 9A which illustrates the state of the collimator and detector head 10 arrangement in the locked position. This state exists when a collimator is securely fastened to the detector head 10. The detector head 10 is positioned to zero degrees (head and gantry rotation) by the gantry system 1085 (see FIG. 10A). Latch pin 315 is mounted within groove 317 and Hall effect sensor 310a reports the locked status. To remove a collimator from detector head 10, the carriage 220 is emptied by action of the exchanger assembly 250 and will roll along the bridge 200 via gear track 231 until aligned along bridge 200 to the locked position beneath detector head 10 when rotated by the gantry 260 to the zero degree position. The detector head 10 is lowered by the gantry 260 until the mounting shafts 336 and 336a reach the receiving notches 330 and 330a of carriage segment 220a. Refer now to FIG. 9B. At this point, the push plate 234 of the carriage segment 220a will push up latch pin 315 out of groove 316 to allow the sliding lock plate to move. The carriage segment 220a of the present invention is then moved along the bridge 200 to the unlocked position to force the sliding lock plate 253 to slide relative to the detector head 10 (guide block 232 drives the drive block 393a) so that the hooks 328 and 328a of the plate 253 withdraw from the mounting shafts 336 and 336a of the collimator. The collimator remains stationary with respect to the detector head 10 surface when the sliding lock plate 253 moves because the conical pins extruding from the detector's imaging surface prevent collimator movement. Once moved, the sliding lock plate 253 no longer retains the collimator mounting shafts bolts 336 and 336a with the hooks 328 and 328a and therefore the collimator is free from the detector head 10 and rests on the carriage segment 220a.

Refer to FIG. 9C. The detector head 10 of the present invention is then moved radially upward by the gantry computer system 1085 to clear the carriage segment 220a. Latch pin 315 will settle into groove 316, via spring action, as the detector head 10 moves upward away from push plate 234 and will hold the sliding lock plate 253 in the unlocked position. The collimator will remain on carriage segment 220a and the Hall effect sensors 310' will report the unlocked status. Also, the latch pin sensors will indicate it is latched. The sliding lock plate 253 is then in the unlocked position ready to receive a replacement collimator from the carriage segment 220a once the carriage segment 220a receives a new collimator pair from the exchanger assembly 250. The mounting shaft 336 is shown slightly below the sliding lock plate 253 because the detector head 10 is raised to clear the carriage segment 220a.

Refer now to FIG. 7 and the procedure of the present invention for removing a collimator from the lower detector head 12 is explained. Assume the sliding lock plate 255 is in the locked position with shafts 366 and 366a within hooks 373 and 373a and that the latch pin 360 is latched within groove 361 (the locked position). The gantry computer system directs the detector head 1.2 to radius in so that the lower edge of the carriage 220b will fit below the mounting shafts 366 and 366a of the collimator but yet above the drive block 393b and the latch pin 360 as the carriage 220b travels out along the bridge 200 via gear track 231 to the locked position on the bridge 200. With respect to the lower detector head 12, as the upper detector head 10 moves radially downward, lower detector head 12 moves radially upward by the gantry computer system 1085 about 1.2 cm until the latch pin 360 displaces downward (by the bottom of carriage 220b) out of groove 361.

The carriage segment 220b of the present invention is then moved along gear track 231 of bridge 200 to the drive unlock position and the drive plate 236 of carriage 220b drives the drive block 393b so that the sliding lock plate 255 is moved such that hooks 373 and 373a unhook from the collimator shafts 366 and 366a. At this point, the latch pin 360 is just over groove 372 in position 360' but not within the groove because the bottom edge of carriage segment 220b is holding the latch pin 360 in the unlatched position. The detector head 12 is then moved radially downward by the gantry computer system 1085 and the collimator is caught by the carriage segment 220b via notches 365 and the detector head 12 is free to move clear of the carriage. As the detector head 12 moves down the locking plate is held unlocked by the drive plate 236 until latch pin 360 is inserted, via spring action, into groove 372 to keep the sliding lock plate 255 in the unlocked position and ready to receive a replacement collimator from the carriage segment 220b. The Hall effect sensors 375' and 375a' report the locked/unlocked status of the sliding lock plate 255. During the lock to unlock operation, the sliding lock plate 255 slides, via slots 374 and 374a, along rollers 370 and 370a.

Figure 10A:
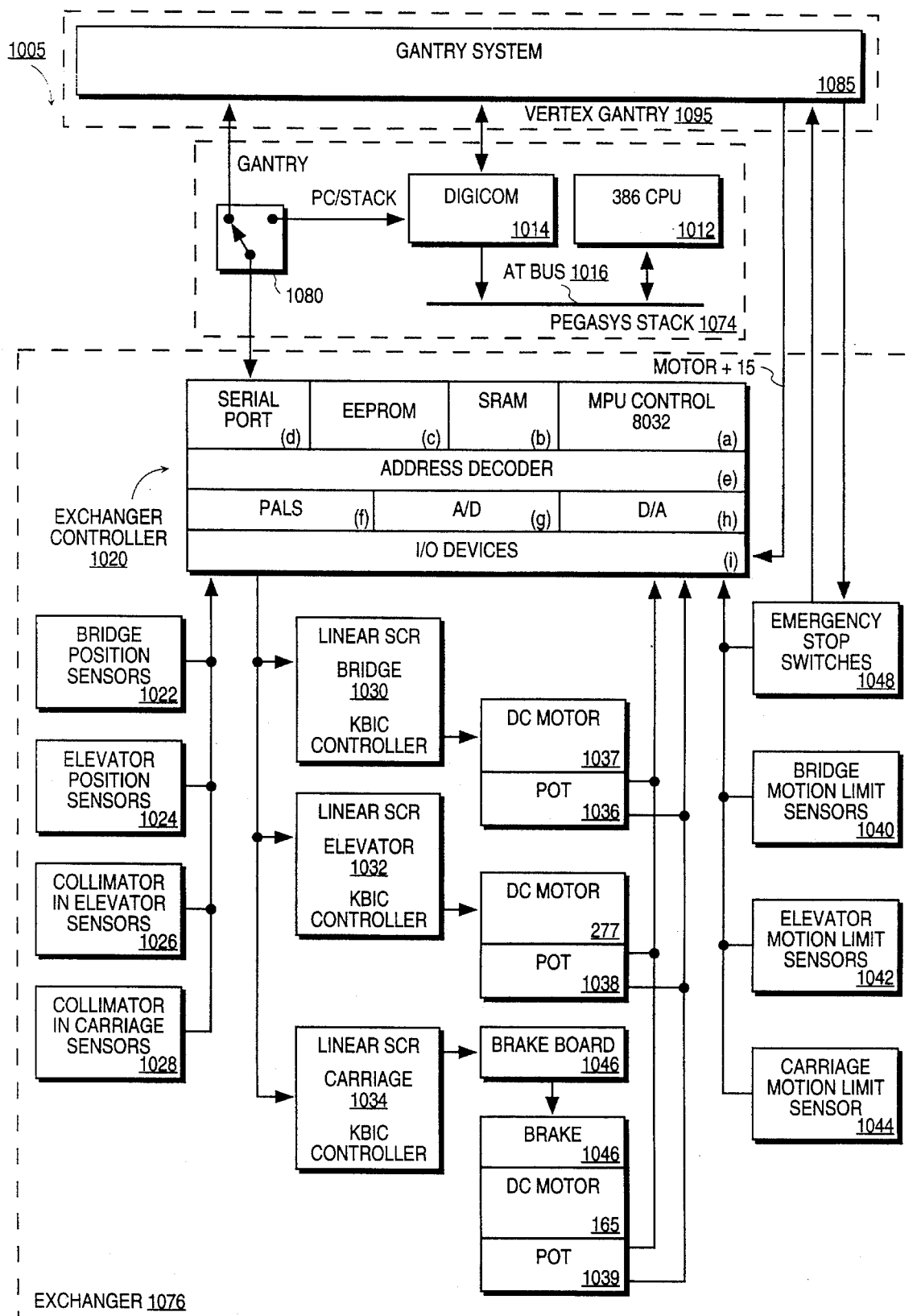
FIG. 10A is a block diagram of the control blocks and communication blocks of the exchanger controller, gantry computer and image processing computer of the present invention.

FIG. 10A illustrates a logical block diagram of the computer systems and controllers utilized by the present invention in order to perform the various procedures described herein. In the following discussion, specific components and parts are listed for example and where appropriate may be substituted within the scope of the present invention with alternative and equivalent components. The control system 1005 of the gamma camera of the present invention is composed of a gantry computer system 1085 for control of the gantry 260, a Pegasys™ computer system 1074 for image data processing and display, and an exchanger controller system 1076 to control the exchanger assembly 250.

The exchanger controller 1076 is a slave device to the gantry computer system 1085. The exchange controller 1076 controls the movements of the elevator rack 275, the bridge 200, and the carriage 220 under direction from the gantry computer system 1085 and examines lock, unlock, and latch sensor inputs during all gantry operations to insure secure attachment of the collimators. The gantry computer system 1085 controls the exchanger controller system 1076 as well as controls motion of the detector heads 10 and 12 and of the gantry structure 260 generally. The gantry computer system 1085 also controls the collection of imaging information during an imaging session and transfers that information to the Pegasys™ computer system 1074 which processes the data and performs ECT reconstruction of the image data and other image processing functions which are not described in detail because they are not entirely pertinent to the present invention. It is appreciated that the Pegasys™ computer system 1074 contains user interface components for image data analysis and these features of the gamma camera system 1005 are not pertinent to aspects of the present invention. Any well known nuclear camera image processing and display computer system may be advantageously utilized by the present invention gamma camera system and exchanger system.

The collimator exchanger controller system 1076 is based around a 12 MHz 8032 microprocessor 1020a. Program code is contained in a 27C128 EPROM memory unit 1020c which is coupled to the microprocessor 1020a. There is 4K×8 byte battery back up external RAM module, a 12-bit analog to digital converter 1020 g for input from the various sensors of the exchanger assembly 250, digital I/O which deliver 27 bits of sensor input and 28 bits of control output, and also 12 bit DAC for input to motor controllers. There are three sources of interrupts within the present invention. An RS232 communication port 1020d using the UART in the 8032 microprocessor 1020a is capable of generating an interrupt. There is a system 100 msec heartbeat tick generated by an 8032 timer which is used as a watchdog timer for error management and also used for other timing operations. Within the exchanger controller 1020 there is also a limit-exceeded interrupt generated by the controller hardware.

As shown in FIG. 10A, the bridge position sensors 1022 (sensor 472), elevator position sensors 1024 (sensors 422, 420, 416, 438, 424, 426, 428, and 430), collimator in elevator sensors 1026 (sensors 480a–480h), and collimator in carriage sensors 1028 (sensors 282a and 282b) of the present invention are wired into the exchange controller 1020 of the present invention to relay status information to the microprocessor 1020a. The exchange control system 1076 also includes three motor control components: a bridge controller 1030, an elevator controller 1032 and a carriage controller 1034. These are each wired into the controller 1020 of the present invention. It is appreciated that any of a number of well known and commercially available hardware motor controllers may be used within the present invention. The bridge controller 1030 is coupled to a DC motor 1037 which raises the bridge 200 or lowers the bridge 200 under direction of the controller 1030. A potentiometer 1036 coupled to the bridge 200 (or may be coupled to the motor 1037) indicates the bridge position to the exchanger controller 1076. The elevator controller 1032 is coupled to the exchanger controller 1020 and controls the DC motor 277 for the elevator rack 275. A potentiometer 1038 is coupled to the exchanger controller 1020 and to motor 277 and relays motor status information (voltage and enable) to the controller 1020. The carriage controller 1034 is coupled to the exchanger controller 1020 and also to the DC carriage motor 165. Two potentiometers 1039 coupled to motor 165 relay DC carriage motor position (voltage) to the controller 1020. A carriage brake board 1046 provides power to a brake and is coupled to the DC motor 165. The brake board receives input from the carriage controller 1034 and releases the brake whenever the DC motor 165 is being driven.

FIG. 10A also illustrates the emergency stop switches 1048 that are contained within the exchange controller system 1076. These switches are hardware controlled to provide emergency stop signals to stop all motion of the present invention, including bridge motion, carriage motion, elevator motion and all gantry motions. These switches may be operator controlled or may be activated in response to an error condition detected by the exchanger controller 1076 or by the gantry system 1085. The bridge motion limit sensor 1040 (sensors 470 and 474), the elevator motion limit sensors 1042 (sensors 434 and 414) and the carriage motion limit sensor 1044 (sensor 478) are also coupled to communicate to the exchanger controller 1020 of the present invention. Position sensing is accomplished via the optical sensors as discussed previously, and potentiometers connected through voltage dividers to the ADC 1020g. A multiplexer selects the potentiometer to read. Motor voltages of the exchanger assembly 250 are set by the DAC 1020h, and by direction of bits wired to port 1 of the microprocessor 1020a. One of three power amplifiers may be enabled for the particular motor (165, 277 or 1037), with or without limit checking, and thus controlled from the software. If limit checking is enabled for the particular motion, the triggering of either limit on that axis for a given motor will automatically shut off the power amplifier for that motor and power down the motor.

Gantry Computer System 1085

Figure 10B:
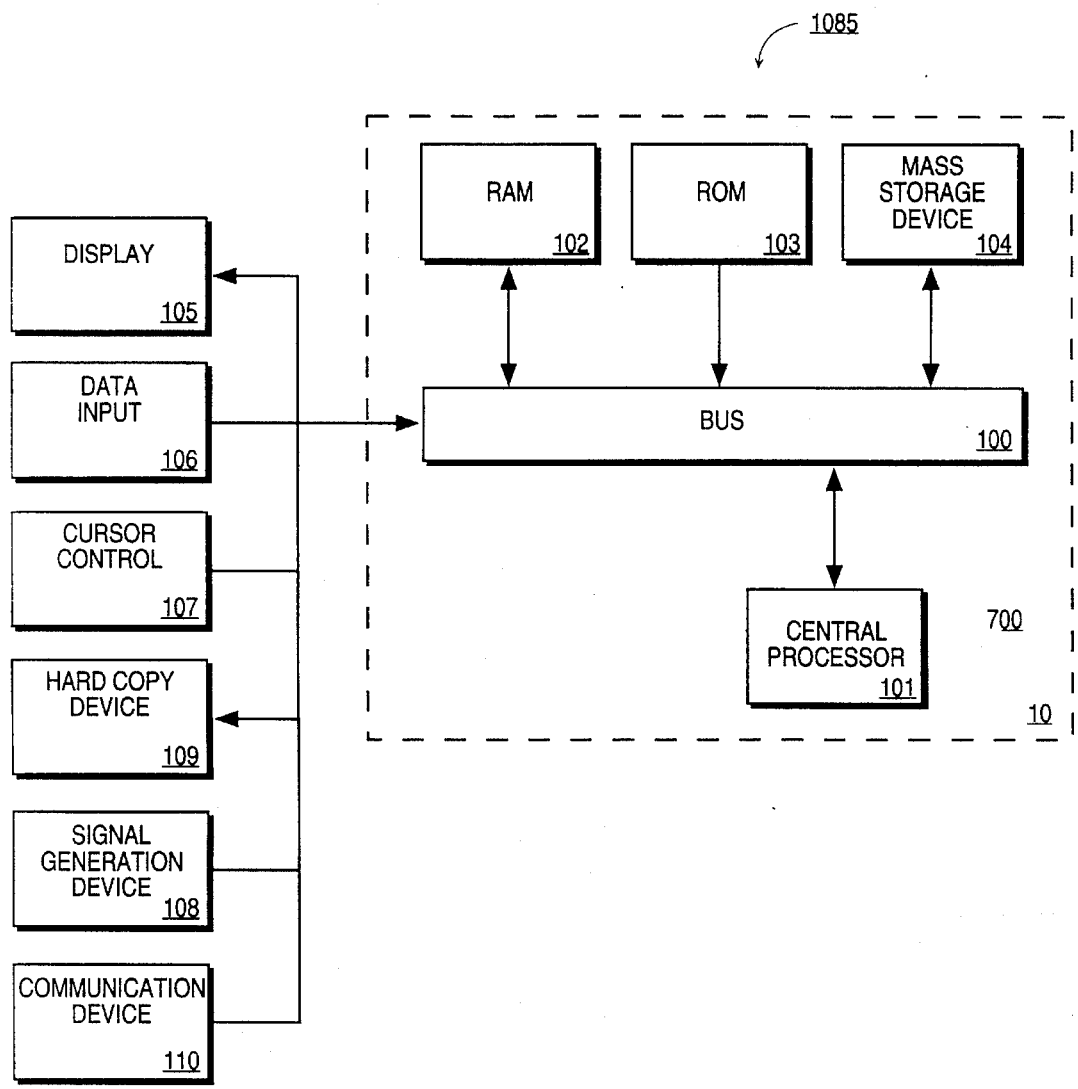
FIG. 10B is a logical block diagram of the gantry computer system used by the present invention to execute instructions and process data to perform the collimator exchange functions.

The details of the gantry computer system 1085 used by the preferred embodiment of the present invention is illustrated in block diagram format in FIG. 10B. This general purpose computer system 1085 is employed to execute program instructions and process data and to control the exchanger MPU 1020a of the exchanger controller 1020 (FIG. 10A) and reports image and status information to the Pegasys™ computer system 1074. The gantry computer system 1085 comprises a bus 100 for communicating information, a central processor, 101 coupled with the bus for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic disk and disk drive coupled with the bus 100 for storing information and instructions may optionally be employed, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101 may optionally be provided, and a signal generating device 108 coupled to the bus 100 for communicating command selections to the processor 101. There is also included an RS-232 communication block 110 for communication of instructions and data to other computer systems of the present invention, including the exchanger MPU. A hardcopy device or printer 109 may be optionally employed to record historical data on the operation of the exchanger assembly 250 and can be used to indicate the amount of exchanges performed and collimator use for a given period.

The display device 105 utilized with the computer system and the present invention of FIG. 10B may be a liquid crystal device, an LED display, cathode ray tube, or other display device suitable for creating graphic images and alphanumeric characters recognizable to the operator. The optional cursor control device 107 allows the computer user to dynamically signal the two dimensional movement of a visible symbol (pointer) on a display screen of the display device 105 or to select from a variety of displayed or highlighted choices on an alpha-numeric display; the keyboard entry 106 may also be employed. The cursor control unit of the present invention is located on the keyboard 106 as a function key grouping. The display 105 is adapted to display information regarding the types of collimators available for exchange within the trays 215 of the elevator unit 250. The operator is allowed to select, via the keyboard 106, from a number of preprogrammed and displayed pairs or may create a new, additional, pair to load onto the detector heads. The operator may also select a single collimator to exchange with a single head while leaving the other head-collimator arrangement unchanged. The display unit 105 displays, in LED form, the status of the exchange operation while it is underway and any error information if encountered during an exchange operation. The display 105 will also relay messages if an operator attempts to exchange collimators that are not available within the gamma camera system. Error messages are displayed over display 105 of the present invention.

Figure 11:
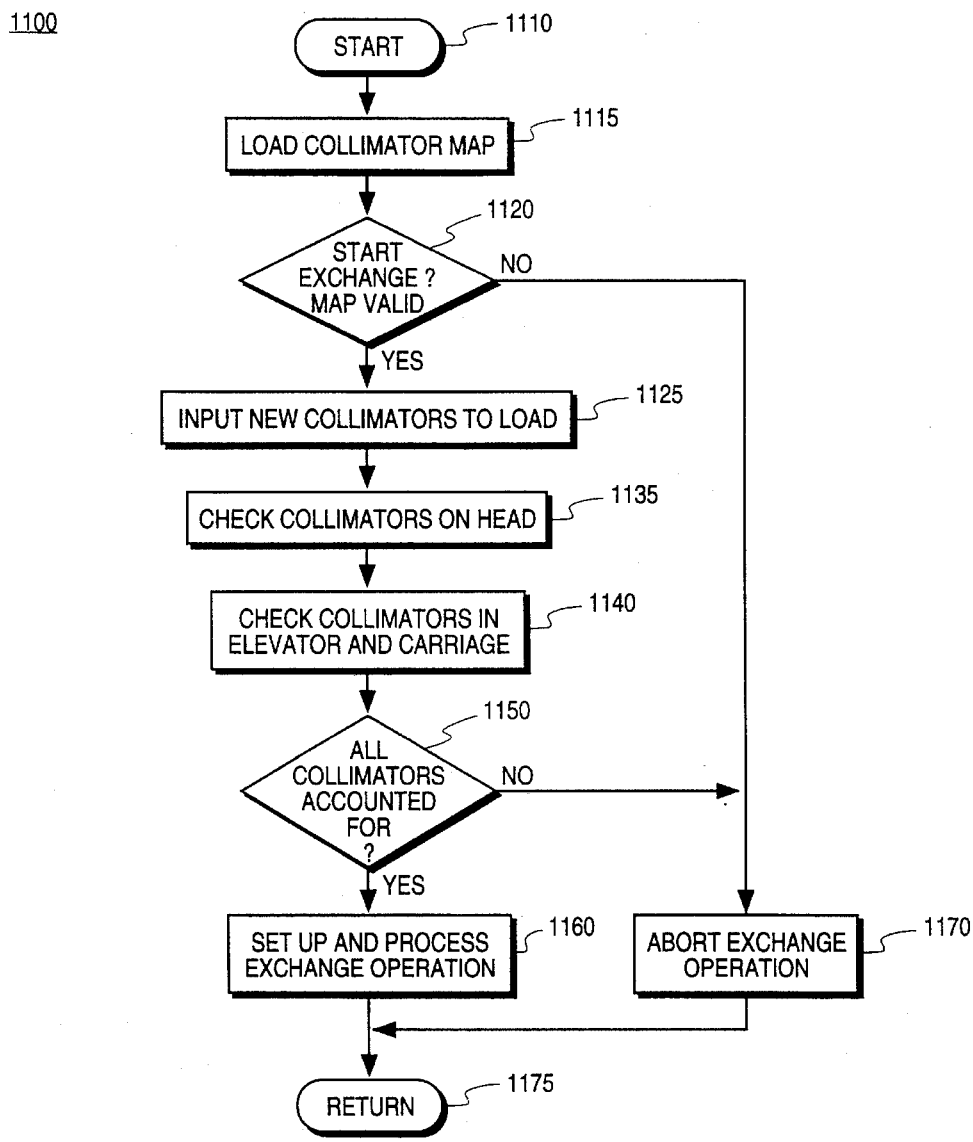
FIG. 11 is a flow diagram illustrating some of the major overall software controlled processing blocks of the present invention required to perform a collimator exchange operation.

FIG. 11 illustrates the major processing tasks executed by the gantry computer system 1085 in order to perform simultaneous dual collimator exchanges of the present invention. Although systems of the present invention are programmed in the C language, a number of equivalent program languages are commercially available and may be employed within the scope and spirit of the present invention. Overall exchange procedure 1100 begins at block 1110 and proceeds to block 1115 where a collimator map is loaded by a gantry request to the collimator exchanger. The collimator map informs the computer system 1085 of all types of collimators loaded in the gantry exchangers system and which type of collimator stores in each of the trays of the elevator rack. This information may be programmed into the computer system 1085 via the keyboard entry 106 and the display LED 105 or may be loaded via the Pegasys™ computer system 1074. The collimator map (entries comprise tray identifier and collimator type) may be displayed on the display unit 105 at any time as part of a collimator exchange operation.

The present invention waits at block 1120 until an exchange operation is requested by a clinician. If an exchange is required, the collimator map is loaded and verified. If the map is not verified then the processing flows to block 1170 where the exchange operation is aborted and the processing returns via block 1175. If the map verifies then the present invention directs the computer system 1085 to process block 1125 where the user is queried at the display 105 to select the types of collimators that should be loaded into the detector heads 10 and 12. One collimator may be selected to load onto a single detector head 10 or 12, or alternatively, two collimators may be selected for loading on both detector heads. The user makes the selection from a display menu by the keyboard 106 and may use a cursor selection button 107 to select from a menu of items which inform the computer 1085 of which collimators to load onto which detectors. A preprogrammed menu may also be selected which allows the user to select a particular type of preprogrammed study having default collimator arrangements and default collimator pairs. If preprogrammed studies are present have predefined collimator configurations, upon selecting a study type, the computer system 1085 can automatically determine which collimators should be loaded onto which detector heads and determines which trays 215 within the elevator to receive the removed collimators from the detector heads.

After selection of the collimators for loading and their destination detector heads, the present invention at block 1135 checks the collimator identification binary codes of the collimators that are installed on the detector heads 10 and 12. The identification sensors in each detector read a hardwired binary identification code placed on each collimator. The computer system 1085 records the identification of the collimators, if any, loaded in the detector heads of the gamma camera gantry 260. Next, at block 1140 the computer system 1085 checks which elevator trays are loaded with collimators by requesting that the exchanger controller 1076 read and report the status of the microswitches 280a–280h of the elevator. Also at block 1140, the procedure 1100 checks the presence sensors in the carriage to determine if any of the collimators are loaded in the carriage 220. At block 1150, the computer 1085 compiles a list of all the collimators it can sense in order to determine if all the collimators entered in the collimator map can be accounted for. If all the collimators are not accounted for, or there are too many collimators in the system, processing flows to block 1170 to abort the exchange operation. An error message will be displayed to the user over display 105 and the procedure returns via block 1175. The present invention will not attempt an exchange operation with an invalid collimator map because the collimators required for exchange may not be present and also there could be a physical error condition resulting in the invalid collimator map. At block 1150 if all collimators are accounted for the flow continues to block 1160. At block 1160, the collimator map and the collimators of the elevator trays, detector heads, and of the carriage will verify and therefore a proper exchange operation may commence. Block 1160 will be described in detail to follow with regard to FIG. 12. After the exchange operation is complete, the user is informed of the proper exchange via the display device 105 and the procedure returns via block 1175.

Figure 12:
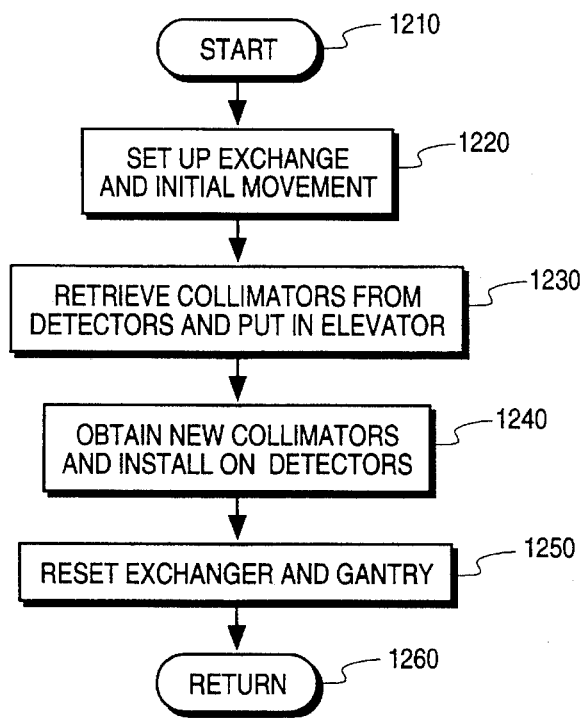
FIG. 12 is a flow diagram illustrating processing blocks of the exchange operation of the present invention once the collimator map is verified.

Refer now to FIG. 12 where block 1160 is further explained. Processing begins at block 1210 and flows to block 1220 where the gantry system 1085 determines which collimators to store (if any), which collimators to retrieve (if any), and sets up the sequence of steps to produce the desired results it then performs the initial movements of the exchanger assembly 250 and of the gantry 260 to prepare for the exchange operation. These positions represent the initial configuration required to transfer the gamma camera gantry 260 and exchanger assembly 250 from (1) an imaging mode in which image data may be collected in a clinical study to (2) an exchange mode in which collimators may be exchanged. The detailed processing of block 1220 will be explained in depth with reference to FIG. 13. After the initial configuration for collimator exchange has taken place with respect to the gantry 260 and the exchanger assembly 250, the present invention flows to block 1230 where the collimators that are presently on the detectors 10 and 12 that need to be removed are removed from the detector heads and are transferred onto the carriage 220. These collimators (or collimator) are then loaded onto a tray level of the elevator rack 275 of the present invention. The detailed steps of block 1230 will be explained in more depth with respect to FIG. 14.

The processing of the gantry computer system 1085 of FIG. 12 then flows to block 1240 where the selected collimators required for exchange are obtained from the elevator trays and simultaneously loaded onto the empty slots of the carriage segment 220*a* and 220*b*. The carriage 220 then rolls onto the horizontally extended bridge 200, aligns with the detectors 10 and 12 and will install the selected collimators onto the detector heads, two at a time, if required. The detailed steps of block 1240 will be explained in more detail with respect to FIG. 15. The processing of the present invention then proceeds to process block 1250 where the gantry 260 and exchanger assembly 250 are reset to the imaging mode so that the newly installed selected collimators may be used for a clinical imaging session. The detailed processing steps of block 1250 are explained in more depth with reference to FIG. 16. At block 1260, the processing of the present invention returns. The discussions that follow explain the detailed procedures executed by the gantry computer system 1085 of the present invention in performance of procedures 1220, 1230, 1240, and 1250.

Figure 13:
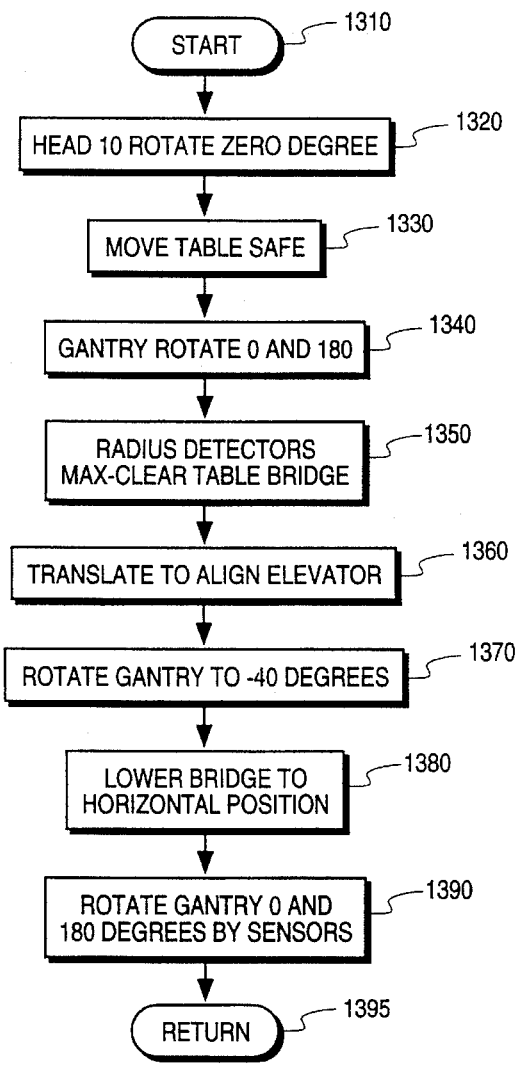
FIG. 13 is a flow diagram of the present invention illustrating the processing flow of the initial movements of the components of the gamma camera system in preparation for the exchange operation.

Refer to FIG. 13 which illustrates the detailed processing tasks executed by the gantry computer system 1085 and required of block 1220 of the present invention to perform the initial movements to prepare for an exchange operation. The processing of block 1220 begins at block 1310 and flows to block 1320 where detector 10 is rotated about its axis in order to square up the detector so that the imaging surfaces of detectors 10 and 12 are facing each other. Next, at block 1330, the table 17 is displaced clear to a safe position to avoid the detector heads 10 and 12 by moving the table to the center. Next, at block 1340 the gantry is rotated such that detector heads 10 and 12 are located along the gantry at zero and 180 degree positions, respectively, such that detector 10 is directly above detector 12. Also at block 1340 the entire gantry structure 260 is translated along the track that runs along the axis of the table 17 (the central axis of the gantry 260) in order to position the gantry structure 260 to a zero and known position such that the exchanger position (at the sensor) may be reset. Also, the detectors 10 and 12 radius out to a known or reference position to reset detector radius positions (at the sensors). At block 1350, the detector heads 10 and 12 radius out to the maximum or exchange position and the table is moved to an exchange position out of the way of the bridge 200 and the carriage 220. At block 1350 detector head 12 moves radially inward in order to avoid the bridge arm 210 as the bridge 200 is extended horizontally. The table is positioned vertically such that carriage segment 220*a* will be positioned above the table and carriage segment 220*b* will be positioned below the table. At block 1360, the gantry is translated to align with the exchanger unit so that the bridge 200 and carriage 220 will pass between the gantry rings.

At block 1370, the gantry computer 1085 rotates the detector heads about the gantry ring 15 such that lower detector head 12 swings 40 degrees from 180 degree position toward the exchanger assembly 250 and upper detector head 10 rotates from its zero degree position 40 degrees away from the exchanger assembly 250. This is accomplished so that the detector heads 10 and 12 are clear of the bridge 200 when it becomes extended horizontally. At block 1380, the gantry computer 1085 directs the exchanger system 1076 to lower the bridge 200 to the horizontal position. The bridge motor 1037 is controlled to swing bridge arm 210 and 211 downward and extend bridge 200 from the vertical position 200' to the horizontally extended position within the gantry structure 260. Next, at block 1390 the gantry computer system 1085 rotates the detectors 10 and 12 about the gantry ring 15 to 0 and 180 degrees, respectively, as determined by the gantry rotate sensors at 0 and 180 degrees. The extended bridge 200 will clear the table 17. The gantry computer system then returns at block 1395.

Figure 14:
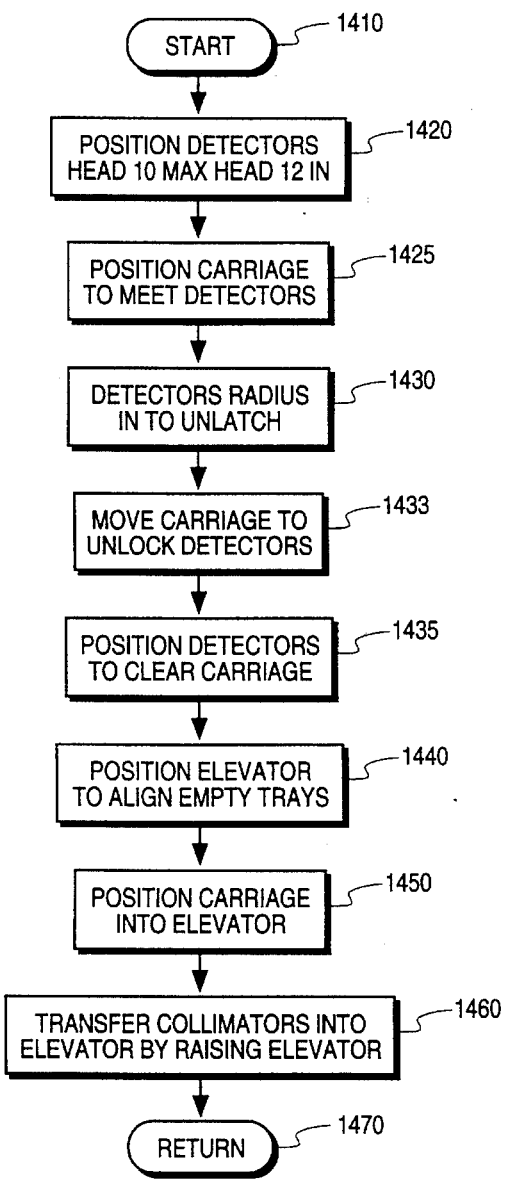
FIG. 14 is a flow diagram of the present invention illustrating the processing flow for simultaneously removing a pair of collimators from the detector heads.

Refer to FIG. 14 which illustrates the detailed processing tasks executed by the gantry computer system 1085 and required of block 1230 of the present invention to remove a pair of collimators from the pair of detector heads and place them into the trays of the elevator rack. The processing begins at block 1410 and proceeds to block 1420 where if there is a collimator on detector 12 and it is to be removed then head 10 is moved radially outward to the maximum position and head 12 is moved radially inward such that the carriage segment 220*b* will be able to position underneath the collimator but the bottom edge of the carriage segment 220*b* will be above the latch pin 360 and drive block 393*b*. If there is not a collimator on detector 12 then detector 12 is radiused to the maximum position. At block 1425, the gantry computer system 1085 directs the exchanger controller 1076 to position the carriage 220 from within the elevator rack 275 onto the extended bridge 200 to the locked position. The carriage rolls out along the V-track 233 via gears 230 powered by motor 165 onto gear track 231 until carriage segment 220*a* is aligned under detector head 10 and carriage segment 220*b* is aligned under detector head 12. The carriage 220 is initially moved along gear track 231 to the locked position because the collimators on the detectors are currently secured. Next, at block 1430, the gantry computer 1085 lowers detector head 10 radially and raises detector head 12 radially (a small amount) until the latch pins 315 and 360 on all sliding lock plate pairs 253 and 255 are unlatched. With the drive blocks 393*a* and 393*b* held in place by the carriage segments 220*a* and 220*b*, respectively, and the latch pins unlatched, at block 1433 the carriage 220 is driven along the bridge to the unlocked position. The gantry computer directs the exchanger system to drive carriage to the unlock position along gear track 231 and V-track 233. As the carriage is driven, the sliding lock plates 253 and 255 on each side of detector heads 10 and 12 slide and become unlocked (the latch pins are unlatched at this point). The collimator mounting shafts become removed from the hooks of the sliding lock plates and the collimators are deposited into the carriage segments. Lock sensors 310*a'* and 375*a'* trigger to a "false" state and unlock sensors 310' and 375' trigger to a "true" state.

At block 1435, the gantry computer 1085 next positions the detector heads 10 and 12 radially to clear the carriage segment 220*a* and 220*b*, respectively. Detector head 10 is moved radially upward and the collimator is caught by carriage segment 220*a* and latch pin 15 latches the plate 253 in the unlock position. Detector head 12 is moved radially downward and the collimator is caught by carriage segment 220*b* and latch pin 360 latches plate 255 in the unlock position. It is appreciated that the movement of the carriage along the gear track 231 unlocks the hooks holding the collimator mounting shafts to the detector heads 10 and 12 allowing the collimators to be transferred to the carriage 220. At block 1440, the elevator rack 275 raises or lowers the elevator rack such that the correct empty level (pair of trays) is aligned to receive the removed collimators in carriage segment 220*a* and 220*b*. The gantry computer 1085 directs the exchanger system 1076 to raise or lower the elevator tray. The elevator is positioned in the on-carriage position for the given empty level and the trays are checked to verify that they are empty. Next, at block 1450, the gantry computer directs the exchanger system 1076 to position the carriage segment 220a and 220b into the elevator rack 275 so that the two collimators removed from the detector heads are in the transfer position within the elevator rack. At block 1460, the gantry computer system 1085 directs the exchanger system 1076 to raise the elevator rack 275 to the on-elevator position (about 60 mm). This action removes the pair of collimators from the carriage segment 220a and 220b and transfers them onto the two trays of the empty level. This transfer is accomplished, in part, by using the mounting shafts of the collimators. At block 1470, the processing of the present invention returns.

Figure 15:
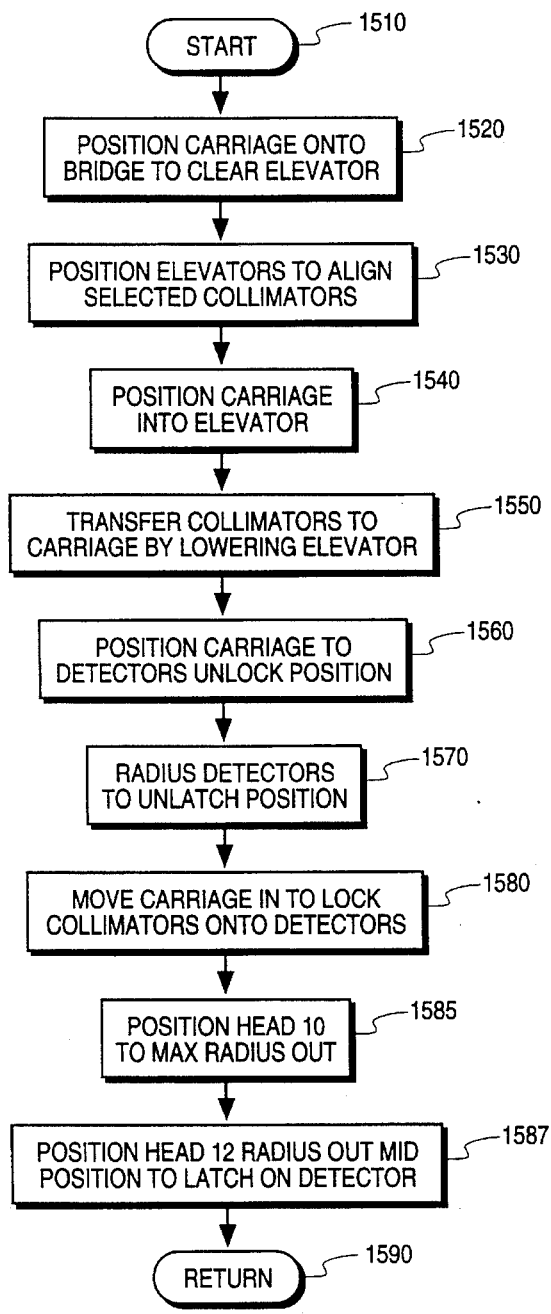
FIG. 15 is a flow diagram of the present invention illustrating the processing flow for simultaneously obtaining and installing a pair collimators onto the detector heads.

Refer to FIG. 15 which illustrates the detailed processing tasks executed by the gantry computer system 1085 and required of block 1240 of the present invention to obtain a pair of collimators from trays of the elevator and simultaneously install them onto the detector heads 10 and 12. Processing begins at block 1510 and continues to block 1520 where the gantry computer 1085 directs the exchanger system to position the carriage 220 onto the bridge 200 and out from the elevator rack 275. Next, the computer system 1085 determines on which level the newly selected collimators are located and at block 1530 the gantry system directs the exchanger system 1076 to adjust the elevator until the selected pair of collimators align with the carriage. The elevator rack 275 is then placed in the on-elevator position for the level that contains the selected collimators for loading. The carriage is then checked to verify that no collimators are present within the carriage trays. At block 1540, the carriage 220 is directed by the gantry system and exchanger system to enter the elevator rack and align to receive the newly selected collimators. At block 1550, the elevator rack is lowered to the on-carriage position for the aligned level by direction of the gantry system 1085. At this point, the present invention has loaded the selected pair of collimators onto the carriage segment 220a and 220b.

At block 1560, the gantry computer system 1085 directs the exchanger system 1076 to position the carriage 220 out of the elevator rack onto the bridge 200 and down gear track 231 and V-track 233 until the carriage 220 is in the unlocked position and aligned with the unlocked and empty detector heads 10 and 12. At block 1570, the gantry computer 1085 directs the detector head 10 to lower radially until the detector 10 push plate 234 (of carriage segment 220a) unlatches the latch pin 315 while the push plate 234 holds the plate 253 unlocked. The detector head 12 is raised radially and will lift the detector in carriage 220b up and also unlatch latch pin 360 but drive plate 236 will prevent the sliding lock plate 255 from closing. At this point the conical pins of the detector heads enter the corresponding receiving holes of the collimators and the collimator mounting shafts align with the long end of the hooks of the unlocked sliding lock plates 253 and 255. The latch pins of the sliding lock plates 253 and 255 are pushed into the unlatch positions and the sliding lock plates are free to move. At block 1580, the gantry computer 1085 directs the exchanger 1076 to drive the carriage 220 along gear track 231 and V-track 233 to the locked position. This forces the sliding lock plates 253 and 255 to lock the hooks of the sliding lock plates around the mounting shafts of the collimators. Lock plate 255 and lock plate 253 are moved by interface between the drive blocks 393b and 393a and the push plates 236 and 234. The collimators do not slide relative to the detector heads 10 and 12 during this operation because the conical pins are inserted into the collimator holes. Lock sensors 310a' and 375a' trigger to a "true" state and unlock sensors 310' and 375' trigger to a "false" state.

Referring to FIG. 15, at block 1585 the gantry computer 1085 directs detector 10 to raise radially to the maximum position to remove the collimator from the carriage segment 220a and also latches the latch pin 315 so that plate 253 is locked. At block 1587 the detector 12 is moved radially downward about 1.2 cm so that the latch pin 360 is latched to lock the lock plate 255. The selected collimators are now securely fastened onto the detector heads 10 and 12. Using the above procedure, a pair of collimators may be simultaneously removed from a pair of detector heads and a new selected pair of collimators may be simultaneously loaded onto the detector heads. At block 1590, the processing of the present invention returns.

Figure 16:
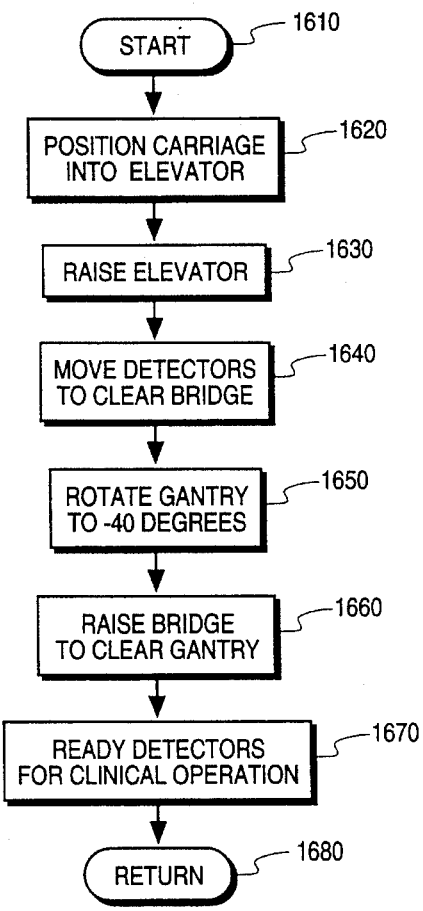
FIG. 16 is a flow diagram of the present invention illustrating the processing flow for completing the exchange operation and readying the system for a clinical study.

Refer to FIG. 16 which illustrates the detailed processing tasks executed by the gantry computer system 1085 and required of block 1250 of the present invention to perform the reset movements to prepare the gantry structure 260 and exchanger assembly 250 for a clinical imaging mode. The processing begins at block 1610 and flows to block 1620 where the gantry computer 1085 directs the exchanger controller system 1076 to roll the carriage from the bridge 200 to a position within the elevator rack. Next, at block 1630 the gantry computer directs the exchanger system to raise the elevator rack 275 to the on-elevator position. At block 1640, the gantry computer system 1085 directs the detector head 10 to move radially upward to the maximum and moves the detector 12 to a position approximately 12.5 cm in from the maximum, so that when the gantry 260 rotates, detector 12 will not collide with the bridge 200. These movements are made so that the detectors 10 and 12 will clear the bridge 200 that will be reset to the vertical position.

At block 1650 of FIG. 16, the present invention causes the gantry computer system 1085 to rotate the gantry ring 15 by 40 degrees so that the lower detector head 12 swings toward the exchanger assembly 250 and the upper detector head 10 swings away from the exchanger assembly 250 by 40 degrees. At block 1660, the gantry computer 1085 directs the exchanger system 1076 to cause the bridge motor 1037 to raise the bridge 200 via bridge arms 210 and 211 which are retracted and bridge 200 moves to the vertical position 200' avoiding the gantry structure 260. Next, at block 1670 the detectors 10 and 12 are rotated about gantry 15 to zero degrees and 180 degrees to ready for a clinical operation. At block 1680 the processing of the present invention returns. At this point the exchange operation is completed and the gantry system 260 and the Pegasys™ computer may be employed for a clinical operation for imaging a patient.

Multiple Single Collimator Exchanges

While the above discussions of the present invention have primarily described dual collimator exchange operations, it is appreciated that the present invention is extremely adept and configured for performing single collimator exchange operations. If a pair of collimators are present in the elevator 275 at a given level (0, 1, 2, or 3), the carriage 220 will pick up both of them. To mount a single collimator, both are brought out into the gantry, but only one detector is moved to enable mounting, then the other collimator is returned to the elevator. For instance, if only the collimator on the upper detector head 10 needs to be exchanged, the above exchange operation may be performed, except that the lower detector head 12 will not radius inward toward the carriage segment 220b during the removal processing (e.g., block 1230) and will not radius inward toward the carriage segment 220*b* during the installation processing (e.g., block 1240). Since the detector head 12 remains clear of the carriage during the above locking and unlocking procedures, only the collimator on detector head 10 will be exchanged with a newly selected collimator from elevator rack 275. The collimator on detector head 12 will remain the same. The same is true for detector head 12, if only the collimator on detector head 12 needs exchanging, then during the processing of blocks 1230 and 1240, detector head 10 will remain well clear of the carriage segment 220*a* and will not engage in the locking and unlocking maneuvers of the present invention.

Also, the carriage 220 does not return a single collimator to an empty elevator tray if the other tray at the same level contains a collimator within it. If a single collimator is to be removed from a detector, and its paired collimator is in the elevator 275, then its paired collimator is put onto the carriage 220 and brought into the gantry, where the collimator to be removed from the detector is removed from the detector and placed onto the carriage 220 in the normal fashion. Both collimators are then put back into the elevator 275 together.

In a fully configured collimator map, e.g., all four elevator levels are occupied, the present invention will allow the selection of a single collimator to be placed on either detector, a pair of collimators to be placed on the detectors (where a pair may be one collimator for each detector which are stored at the same elevator level) or either or both detectors may be selected to have no collimators on it. The current configuration does not matter.

For instance, to put a pair of collimators on the detectors from level 3 when single collimators from other levels are currently on the detectors (say a level 1 collimator is on detector 10 and a level 2 collimator is on detector 12) the following five step procedure is followed by the present invention. First, process the above described initialization steps as done in block 1220. Second, move the carriage 220 onto the bridge, adjust the elevator to level 2 (the on-elevator position), bring the carriage 220 into the elevator, lower the elevator to the on-carriage 220 position for level 2 (placing detector 10's level 2 collimator on the top of the carriage 220), bring the carriage 220 out to the lock position, move the detector 12 radius and carriage 220 motions to place the detector 12 collimator on the bottom of the carriage 220, return the carriage 220 to the elevator, and raise the elevator to the on-elevator position for level 2. Third, move the carriage 220 onto the bridge, adjust the elevator to level 1 (on-elevator position), bring the carriage 220 into the elevator, lower the elevator to the on-carriage 220 position for level 1 (placing detector 12's level 1 collimator on the bottom of the carriage 220), bring the carriage 220 out to the lock position, move the detector 10 radius and carriage 220 motions to place the detector 10 collimator on the top of the carriage 220, return the carriage 220 to the elevator, and raise the elevator to the on-elevator position for level 1. Fourth, go through the normal processing to mount the pair of collimators from level 3 as done in block 1240. Fifth, finish the exchange and perform the functions of block 1250. It is appreciated that the collimator exchange procedures will not respond to a command to mount a target collimator on a given detector if that detector already reports to the exchanger MPU 1076 that it contains the target collimator.

For a collimator installation phase of a single detector head exchange, a carriage 220 containing two collimators may be sent out to align with the detectors, but only one collimator will be installed onto one detector head, the other detector head remaining radially distant from the carriage 220.

It is appreciated that by performing the above single collimator exchange operations, it is possible to exchange the collimators that are mounted on the detector heads 10 and 12 with a pair of newly selected collimators that are not part of a single level but are rather split between two levels. In such an instance, two single collimator exchange operations of the present invention are required that each install a collimator from a different level onto a separate detector head. For instance, the upper detector head 10 may be loaded with a collimator from level 1 first while the lower detector head 12 of the present invention is loaded with a collimator from level 2 subsequently in a different exchange procedure. However, if the collimators are located within a single given level, they can both be simultaneously loaded onto the detector heads 10 and 12. It is appreciated that the overwhelming majority of exchange operations of the present invention involve pairs of collimators that are associated with a single level for a given study. And, although it is rare to install pairs of collimators from separate levels, the present invention is well capable of performing such exchange operation.

The preferred embodiment of the present invention, an automated collimator exchanger device and method for use to simultaneously exchange pairs of collimators (or a single collimator) for a dual detector head camera system, is thus described. While the present invention has been described in particular embodiments, it should be appreciated that the present invention should not be construed as limited by such embodiments, but rather construed according to the below claims.

What is claimed is:

1. An apparatus for transferring a collimator between an imaging surface of a detector head and a collimater storage means, said detector head supported by a gantry structure, said apparatus comprising:

bridge means for positioning a portion of a track means horizontally within said gantry structure, said bridge means coupled to said collimator storage means;

carriage means coupled to traverse said track means, said carriage means for moving said collimator between said detector head and said collimater storage means; and locking means coupled to either side of said detector head for transferring said collimator between said imaging surface of said detector head and said carriage means.

2. An apparatus for transferring a collimator associated with an imaging surface of a detector head as described in claim 1 wherein said collimator storage means comprises elevator means for positioning a rack of collimator trays to align said collimator with said track means and for supplying said collimator to said carriage means.

3. An apparatus for transferring a collimator associated with an imaging surface of a detector head as described in claim 1 wherein said locking means comprises:

slide plate means for locking said collimator to said detector head and for unlocking said collimator from said detector head; and latch pin for latching said slide plate means into a locked position or into an unlocked position.

4. An apparatus for transferring a collimator associated with an imaging surface of a detector head as described in claim 3 wherein said slide plate means comprises sliding hooks for locking onto or releasing mounting shafts of said collimator.

5. An apparatus for transferring a collimator associated with an imaging surface of a detector head as described in claim 3 further comprising means for positioning said detector head toward or away from said carriage means when said carriage means is aligned along said track means with said detector head; and wherein said carriage means comprises means for unlatching said latch pin means when said detector head contacts said carriage means and for latching said latch pin means when said detector head separates from said carriage means.

6. An apparatus for transferring a collimator associated with an imaging surface of a detector head as described in claim 5 further comprising means for driving said slide plate means to release said collimator from said detector head and for driving said slide plate means to lock said collimator to said detector head.

7. An apparatus for transferring a collimator associated with an imaging surface of a detector head as described in claim 6 wherein said means for driving said slide plate means comprises:

drive plate means coupled to said carriage means for coupling said carriage means to said slide plate means; and a carriage motor means for driving said carriage means and said drive plate means.

8. In a camera system, an apparatus for exchanging a collimator associated with an imaging surface of a detector head, said apparatus comprising:

elevator for aligning a plurality of collimator trays with a track;

bridge mechanism for positioning a portion of said track horizontally within a gantry structure, said bridge mechanism positioned approximate to said elevator;

carriage unit coupled to traverse said track, said carriage unit for moving said collimator between said detector head and said elevator; and locking mechanism coupled to either side of said detector head for installing said collimator to said imaging surface of said detector head and for removing said collimator from said imaging surface.

9. An apparatus for exchanging a collimator associated with an imaging surface as described in claim 8 wherein said locking mechanism comprises:

slide plate for locking said collimator to said detector head and for unlocking said collimator; and latch pin for latching said slide plate in a locked position or in an unlocked position.

10. An apparatus for exchanging a collimator associated with an imaging surface as described in claim 9 wherein said slide plate comprises sliding hooks for locking onto or releasing mounting shafts of said collimator.

11. An apparatus for exchanging a collimator associated with an imaging surface as described in claim 9 further comprising means for positioning said detector head toward or away from said carriage unit when said carriage unit is aligned along said track with said detector head; and wherein said carriage unit comprises means for unlatching said latch pin when said detector head contacts said carriage unit and for latching said latch pin when said detector head separates from said carriage unit.

12. An apparatus for exchanging a collimator associated with an imaging surface as described in claim 11 further comprising means for driving said slide plate means to release said collimator from said detector head and for driving said slide plate means to lock said collimator to said detector head.

13. An apparatus for exchanging a collimator associated with an imaging surface as described in claim 12 wherein said means for driving said slide plate means comprises:

drive plate coupled to said carriage unit for coupling said carriage unit to said slide plate; and a carriage motor for driving said carriage unit and said drive plate.

14. An apparatus for exchanging a collimator associated with an imaging surface as described in claim 9 further comprising support means for raising said bridge mechanism to a vertical position clear of said gantry structure and for lowering said bridge mechanism to a horizontally extended position within said gantry structure.

15. An apparatus for exchanging a collimator associated with an imaging surface as described in claim 8 wherein said elevator comprises an elevator motor for raising and lowering said plurality of collimator trays to transfer said collimator between said carriage unit and said elevator.

16. An apparatus for exchanging a collimator associated with an imaging surface as described in claim 8 wherein said carriage unit comprises a carriage motor for driving said carriage unit across said track between said elevator and a position aligned with said detector head of said gantry structure when said bridge mechanism is horizontal.

17. An apparatus for exchanging a collimator associated with an imaging surface as described in claim 16 wherein said carriage unit further comprises:

a ridged gear coupled to said track and coupled to a drive sprocket; and a chain coupled to said carriage motor and coupled to said drive sprocket for driving said carriage unit.

18. An apparatus for exchanging a collimator associated with an imaging surface as described in claim 16 wherein said carriage motor is coupled to a side of said carriage unit that faces said gantry structure when said carriage unit is positioned within said elevator so that said carriage motor clears said elevator.

19. An apparatus for exchanging a collimator associated with an imaging surface as described in claim 8 further comprising:

exchanger controller processor for controlling positioning of said carriage unit, said elevator, and said bridge mechanism;

flex cable coupling said carriage unit to said exchanger controller processor for supplying control and sensor information between said carriage unit and said exchanger controller processor; and cable supply mechanism coupled to said elevator for extending or retracting said flex cable as said carriage unit traverses said track, said cable supply comprising a double back means for causing said cable supply to reverse direction when said carriage unit crosses a threshold of said elevator.

20. An apparatus for exchanging a pair of collimators associated with imaging surfaces of a pair of detector heads, said apparatus comprising:

track means for providing a pathway to carry said pair of collimators;

bridge means for positioning a portion of said track means horizontally within a gantry structure, said bridge means coupled to a collimator storage means;

carriage means coupled to traverse said track means, said carriage means for moving said pair of collimators between said pair of detector heads and said collimator storage means; and locking means coupled to each detector head of said pair of detector heads for simultaneously installing said pair of collimators to said imaging surfaces and for simultaneously removing said pair of collimators from said detector heads.

21. An apparatus for exchanging a pair of collimators for imaging surfaces of a pair of detector heads as described in claim 20 wherein said collimator storage means comprises elevator means for positioning a rack of collimator trays to align said pair of collimators with said carriage means.

22. An apparatus for exchanging a pair of collimators for imaging surfaces of a pair of detector heads as described in claim 20 wherein said locking means comprises:

slide plate means for locking to couple each collimator of said pair of collimators to a separate detector head of said pair of detector heads and for unlocking to release said each collimator; and latch pin means for latching said slide plate means into a locked position or into an unlocked position.

23. An apparatus for exchanging a pair of collimators for imaging surfaces of a pair of detector heads as described in claim 22 wherein said slide plate means comprises sliding hooks for locking onto or releasing mounting shafts of said pair of collimators for installation or removal of said pair of collimators from said pair of detector heads.

24. An apparatus for exchanging a pair of collimators from imaging surfaces of a pair of detector heads as described in claim 23 further comprising means for positioning said pair of detector heads toward or away from said carriage means when said carriage means is aligned along said track means with said pair of detector heads; and wherein said carriage means comprises means for unlatching said latch pin means of each individual detector head of said pair of detector heads when said each individual detector head contacts said carriage means and for latching said latch pin means of said each individual detector head when said each individual detector head separates from said carriage means.

25. An apparatus for exchanging a pair of collimators for imaging surfaces of a pair of detector heads as described in claim 24 further comprising means for driving said slide plate means of each detector head of said pair of detector heads to simultaneously release said pair of collimators from said pair of detector heads and for driving said slide plate means of said pair of detector heads to simultaneously lock said pair of collimators to said pair of detector heads.

26. An apparatus for exchanging a pair of collimators for imaging surfaces of a pair of detector heads as described in claim 25 wherein said means for driving said slide plate means comprises:

a drive plate coupled to said carriage means for coupling said carriage means to said slide plate means; and a carriage motor for driving said carriage means and said drive plate.

27. An apparatus for exchanging a pair of collimators for imaging surfaces of a pair of detector heads as described in claim 20 further comprising means for raising said bridge means to a vertical position clear of said gantry structure and for lowering said bridge means to a horizontal position extended within said gantry structure.

28. An apparatus for exchanging a pair of collimators for imaging surfaces of a pair of detector heads as described in claim 20 wherein said an elevator means comprises an elevator motor means for raising and lowering said rack of collimator trays to transfer a pair of collimators between said carriage means and said elevator means.

29. An apparatus for exchanging a pair of collimators for imaging surfaces of a pair of detector heads as described in claim 20 wherein said carriage means comprises a carriage motor for driving said carriage means across said track means between said elevator means and a position aligned with said pair of detector heads of said gantry structure when said bridge means is horizontal.

30. An apparatus for exchanging a pair of collimators for imaging surfaces of a pair of detector heads as described in claim 29 wherein said carriage means further comprises:

ridged gear means coupled to said track means and coupled to a drive sprocket; and chain means coupled to said carriage motor and coupled to said drive sprocket for driving said carriage means.

31. An apparatus for exchanging a pair of collimators for imaging surfaces of a pair of detector heads which are coupled to a gantry structure of a gamma camera, said apparatus comprising:

an elevator mechanism for aligning a pair of trays of a plurality of collimator trays with a track;

a draw bridge mechanism for extending a portion of said track horizontally within said gantry structure, said draw bridge mechanism positioned proximate to said elevator mechanism;

a dual tray carriage coupled to traverse said track, said dual tray carriage for moving said pair of collimators between said pair of detector heads and said elevator mechanism; and sliding lock plates associated with each detector head of said pair of detector heads for simultaneously installing said pair of collimators or simultaneously removing said pair of collimators with said detector heads.

32. An apparatus for exchanging a pair of collimators for imaging surfaces of a pair of detector heads as described in claim 31 wherein said elevator mechanism transfers said pair of collimators between said dual tray carriage and said pair of trays of said elevator mechanism.

33. An apparatus for exchanging a pair of collimators from imaging surfaces of a pair of detector heads as described in claim 31 wherein said gantry structure is for positioning said pair of detector heads to contact said dual tray carriage when said dual tray carriage is aligned along said draw bridge with said pair of detector heads.

34. An apparatus for exchanging a pair of collimators for imaging surfaces of a pair of detector heads as described in claim 31 wherein each of said sliding lock plates comprise a latch pin for latching said each sliding lock plate in a locked position or in an unlocked position.

35. An apparatus for exchanging a pair of collimators for imaging surfaces of a pair of detector heads as described in claim 34 wherein said dual tray carriage comprise mechanisms for latching and unlatching said latch pin of said each sliding lock plate when said sliding lock plate is aligned adjacent to said dual tray carriage.

36. An apparatus for exchanging a pair of collimators for imaging surfaces of a pair of detector heads as described in claim 34 wherein said dual tray carriage is also for driving said sliding lock plates to lock and for driving said sliding lock plates to unlock when said latch pin is unlatched.

37. A nuclear camera system comprising:

a pair of detector heads each having an imaging surface for detecting emissions, said pair of detector heads mounted on a gantry structure;

a computer system for receiving and processing information collected by said pair of detector heads; and an exchanger unit for exchanging a pair of collimators associated with said pair of detector heads, said exchanger unit comprising:

a track for providing a pathway to carry said pair of collimators;

bridge mechanism for positioning a portion of said track horizontally within said gantry structure, said bridge mechanism coupled to a collimator storage device;

a carriage mechanism coupled to traverse said track, said carriage mechanism for moving said pair of collimators between said pair of detector heads and said collimator storage device; and a locking mechanism coupled to either side of each detector head of said pair of detector heads for simultaneously installing said pair of collimators and for simultaneously removing said pair of collimators from said pair of detector heads.

38. A nuclear camera system as described in claim 37 wherein said collimator storage device comprises an elevator mechanism for positioning a rack of collimator trays to align said pair of collimators with said carriage mechanism.

39. A nuclear camera system as described in claim 37 wherein said locking mechanism comprises:

a slide plate device for locking to couple each collimator of said pair of collimators to a separate detector head of said pair of detector heads and for unlocking to release said collimators; and a latch pin device for latching said slide plate device into a locked position or into an unlocked position.

40. A nuclear camera system as described in claim 39 wherein said collimators comprise a plurality of mounting shafts and said slide plate comprises sliding hooks for locking onto or releasing mounting shafts of said pair of collimators to install or remove said pair of collimators from said pair of detector heads.

41. A nuclear camera system as described in claim 39 further comprising means for positioning said pair of detector heads toward or away from said carriage mechanism when said carriage mechanism is aligned along said track with said pair of detector heads; and wherein said carriage mechanism comprises means for unlatching said latch pin device of each individual detector head of said pair of detector heads when said each individual detector head contacts said carriage mechanism and for latching said latch pin device of said each individual detector head when said each individual detector head separates from said carriage mechanism.

42. A nuclear camera system as described in claim 41 further comprising means for driving said slide plate device of each detector head of said pair of detector heads to simultaneously release said pair of collimators from said pair of detector heads and for driving said slide plate device of said pair of detector heads to simultaneously lock said collimator to said pair of detector heads.

43. In a dual head gamma camera system having a gantry structure for positioning a pair of detector heads, a method of automatically removing a pair of collimators from said pair of detector heads, said method comprising the steps of:

positioning said pair of detector heads to an exchange alignment;

lowering a bridge mechanism to extend a track within said gantry structure;

positioning a dual tray carriage along said track to align with said pair of detector heads;

positioning said pair of detector heads toward said dual tray carriage to unlatch sliding lock plates coupled to each detector head of said pair of detector heads; and simultaneously transferring said pair of collimators from said pair of detector heads to said dual tray carriage.

44. A method of removing a pair of collimators from a pair of detector heads as described in claim 43 wherein said step of simultaneously transferring said pair of collimators from said pair of detector heads to said dual tray carriage comprises the steps of:

positioning said dual tray carriage along said track to drive said sliding lock plates of said pair of detector heads to an unlocked position;

positioning said pair of detector heads away from said dual tray carriage to simultaneously release said pair of collimators into said dual tray carriage and also to latch said sliding lock plates to said unlocked position.

45. A method of removing a pair of collimators from a pair of detector heads as described in claim 43 further comprising the steps of:

positioning said dual tray carriage from said bridge mechanism into a collimator rack; and raising said collimator rack to transfer said pair of collimators to a pair of empty trays.

46. In a dual head gamma camera system having a gantry structure for positioning a detector head, a method of automatically installing a collimator to said detector head, said method comprising the steps of:

positioning a collimator rack to align a selected collimator with a carriage mechanism;

transferring said selected collimator to said carriage mechanism;

positioning said carriage mechanism along a track of an extended bridge mechanism to align with said detector head;

positioning said detector head toward said carriage mechanism to unlatch sliding lock plates coupled to said detector head; and transferring said selected collimator from said carriage mechanism to said detector head.

47. A method of installing a selected collimator to a detector head as described in claim 46 wherein said step of transferring said selected collimator from said carriage mechanism to said detector head comprises the steps of:

positioning said carriage mechanism along said track to drive said sliding lock plates of said detector head to a locked position; and positioning said detector head away from said carriage mechanism to remove said collimator from said carriage mechanism and also to latch said sliding lock plates to said locked position.

48. A method of installing a selected collimator to a detector head as described in claim 46 further comprising the steps of:

positioning said carriage mechanism from said bridge mechanism into said collimator rack; and raising said bridge mechanism to clear said gantry structure.

49. In a dual head gamma camera system having a support structure for positioning a pair of detector heads, a method of automatically exchanging a pair of collimators associated with said pair of detector heads, said method comprising the steps of:

receiving from a user interface an identity of a selected pair of collimators;

lowering a bridge means to extend a track means within said support structure;

positioning a dual tray carriage means along said track means to align with said pair of detector heads;

simultaneously transferring said pair of collimators from said pair of detector heads to said dual tray carriage means;

storing said pair of collimators into a collimator rack means;

positioning said collimator rack means to align said selected pair of collimators to said dual tray carriage means;

transferring said selected pair of collimators to said dual tray carriage means;

positioning a dual tray carriage means along a track means to align with said pair of detector heads; and simultaneously transferring said selected pair of collimators from said dual tray carriage means to said pair of detector heads.

50. A method of exchanging a pair of collimators associated with a pair of detector heads as described in claim 49 wherein said step of simultaneously transferring said pair of collimators from said pair of detector heads to said dual tray carriage means comprises the steps of:

positioning said pair of detector heads toward said dual tray carriage means to unlatch sliding lock plates coupled to each detector head of said pair of detector heads;

positioning said dual tray carriage means along said track means to drive said sliding lock plates of said pair of detector heads to an unlocked position; and positioning said pair of detector heads away from said dual tray carriage means to simultaneously release said pair of collimators into said dual tray carriage means and also to latch said sliding lock plates to said unlocked position.

51. A method of exchanging a pair of selected collimators associated with a pair of detector heads as described in claim 49 wherein said step of simultaneously transferring said selected pair of collimators from said dual tray carriage means to said pair of detector heads comprises the steps of:

positioning said pair of detector heads toward said dual tray carriage means to unlatch sliding lock plates coupled to each detector head of said pair of detector heads;

positioning said dual tray carriage means along said track means to drive said sliding lock plates of said pair of detector heads to a locked position; and positioning said pair of detector heads away from said dual tray carriage means to simultaneously remove said pair of collimators from said dual tray carriage means and also to latch said sliding lock plates to said locked position.

52. A method of exchanging a pair of selected collimators associated with a pair of detector heads as described in claim 49 further comprising the steps of:

positioning said dual tray carriage means from said bridge means into said collimator rack means; and raising said bridge means to clear said support structure.

53. An apparatus for installing and removing a collimator with a detector head, said collimator having a plurality of mounting shafts located on each side of said collimator, said apparatus comprising:

(a) slide plate mechanisms mounted on each side of said detector head, said slide plate mechanisms having a locked and an unlocked slide position;

(b) drive block mounted on said slide plate mechanisms for interfacing with a drive plate for driving said slide plate mechanism to said locked and unlocked slide position; and (c) shaft securing devices formed within said side plate mechanism for securing said mounting shafts of said collimator to said detector head when said slide plate mechanisms are at said locked slide position.

54. An apparatus for installing and removing a collimator as described in claim 53 further comprising:

latch pin mechanism mounted on said detector head for latching said slide plate in said locked or unlocked slide position, said latch pin mechanism interfacing with a push plate; and wherein said shaft securing devices are also for releasing said collimator when said slide plate mechanisms are at said unlocked slide position.

55. An apparatus for installing and removing a collimator as described in claim 54 further comprising:

a carriage structure for transporting said collimator to and from said detector head, wherein said drive plate and said push plate are mounted on said carriage structure; and a mechanism for moving said carriage structure for allowing said carriage structure to interface with said slide plate mechanism.

56. An apparatus for installing and removing a collimator as described in claim 54 wherein said shaft securing devices are hooks.

* * * * *